(12) United States Patent
Sofos et al.

(10) Patent No.: US 8,811,803 B2
(45) Date of Patent: *Aug. 19, 2014

(54) SYSTEM AND METHOD FOR MANAGING VIDEO RECORDING BASED UPON BLACKOUT EVENTS IN A VIDEO DATA DISTRIBUTION SYSTEM

(71) Applicant: AT&T Legal Department—Roebuck, Patent Docketing, Bedminster, NJ (US)

(72) Inventors: James T Sofos, Aurora, IL (US); Lee M Chow, Naperville, IL (US); David J Piepenbrink, Chicago, IL (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/689,359

(22) Filed: Nov. 29, 2012

(65) Prior Publication Data

US 2013/0209071 A1  Aug. 15, 2013

Related U.S. Application Data

(63) Continuation of application No. 12/271,974, filed on Nov. 17, 2008, now Pat. No. 8,364,022.

(51) Int. Cl.
*H04N 5/76* (2006.01)

(52) U.S. Cl.
USPC ............................................. 386/291

(58) Field of Classification Search
None
See application file for complete search history.

(56) References Cited

U.S. PATENT DOCUMENTS

| 2008/0168487 A1 | 7/2008 | Chow et al. |
| 2009/0102926 A1* | 4/2009 | Bhogal et al. ............. 348/181 |

* cited by examiner

*Primary Examiner* — William C Vaughn, Jr.
*Assistant Examiner* — Daniel Tekle
(74) *Attorney, Agent, or Firm* — G. Michael Roebuck

(57) ABSTRACT

A method is disclosed for managing digital video recording of alternative event data during a blackout of primary event data at a client device, the method including but not limited to receiving notification data indicating that a blackout has been cancelled for a primary event; proceeding with recording the scheduled digital video recording for the primary event; and graphically presenting the notification data of the cancelled blackout for the primary event at the client device. A system is disclosed for performing the method.

14 Claims, 19 Drawing Sheets

| Version = 4 | Start Time = 07:00 | GRC Set No. = 4 | Signature = 123456 | | | | | | |
|---|---|---|---|---|---|---|---|---|---|
| | | Collection of Services / Virtual Channels | | | | | | | |
| GRC/VC | SPN1 | SPN2 | SPNa | SPNb | SPNc | SPNd | SPNe | | SPNjpeg |
| 0 | SPN1 | SPN2 | SPNa | SPNb | SPNc | SPNd | SPNe | | SPNjpeg |
| 1 | SPN1 | SPNc | SPNa | SPNb | SPNc | SPNd | SPNe | | SPNjpeg |
| 2 | SPN1 | SPN2 | SPNa | SPNb | SPNc | SPNd | SPNe | | SPNjpeg |
| 3 | SPN1 | SPN2 | SPNa | SPNb | SPNc | SPNd | SPNe | | SPNjpeg |
| ... | ... | ... | ... | ... | ... | ... | ... | | ... |
| 255 | SPN1 | SPN2 | SPNa | SPNb | SPNc | SPNd | SPNe | | SPNjpeg |

Grouping / Geography

*FIG. 10*

SYSTEM AND METHOD FOR MANAGING VIDEO RECORDING BASED UPON BLACKOUT EVENTS IN A VIDEO DATA DISTRIBUTION SYSTEM

CROSS REFERENCE TO RELATED APPLICATIONS

This application is a continuation of and claims priority from U.S. patent application Ser. No. 12/271,974 filed on Nov. 17, 2008 by Sofos et al. entitled A System and Method For Managing Video Recording Based Upon Blackout Events In A Video Data Distribution System, which is hereby incorporated by reference in its entirety.

BACKGROUND

1. Field of Disclosure

The disclosure relates to the field of video data distribution systems and more specifically to managing video recording.

2. Description of Related Art

Content providers deliver content via broadcasts to a number of users and/or deliver content via on-demand processing based on requests received and content availability. Content providers who have not negotiated broadcast rights for specific programming in certain geographical regions are obligated to restrict access or blackout the content in particular geographical areas. Content providers commonly provide alternative or substituted content that may be shown in areas where the primary content has been blacked out. A content provider typically encrypts and multiplexes the primary and alternative content in channels for transmission to various cable head ends. These signals are de-multiplexed and transmitted to integrated receiver decoders (IRDs) which decrypt the content.

BRIEF DESCRIPTION OF THE DRAWINGS

For detailed understanding of the illustrative embodiment, references should be made to the following detailed description of an illustrative embodiment, taken in conjunction with the accompanying drawings, in which like elements have been given like numerals.

FIG. 10 is an illustration of a data structure containing data indicating substitution retuning for a blackout event;

DETAILED DESCRIPTION OF THE DISCLOSURE

The present disclosure describes a system for updating a video service's Set Top Box's Digital Video Recorder (DVR) schedule based upon programming blackouts ("blackout events") for a subscriber based upon a selection criteria such as a geographic area within a video provider's system. Notification data for scheduled blackout events are sent to the Set Top Box, and a determination of whether or not the events apply to a scheduled DVR recording is performed. User input or an automatic selection criterion is used to then determine the course of action for how the recording event proceeds. A video service provider, such as an internet protocol television (IPTV) system operator initiates programming blackouts according to the schedule dictated by content providers. This is generally based upon contractual obligations between the content provider and the service provider.

Figure 1:
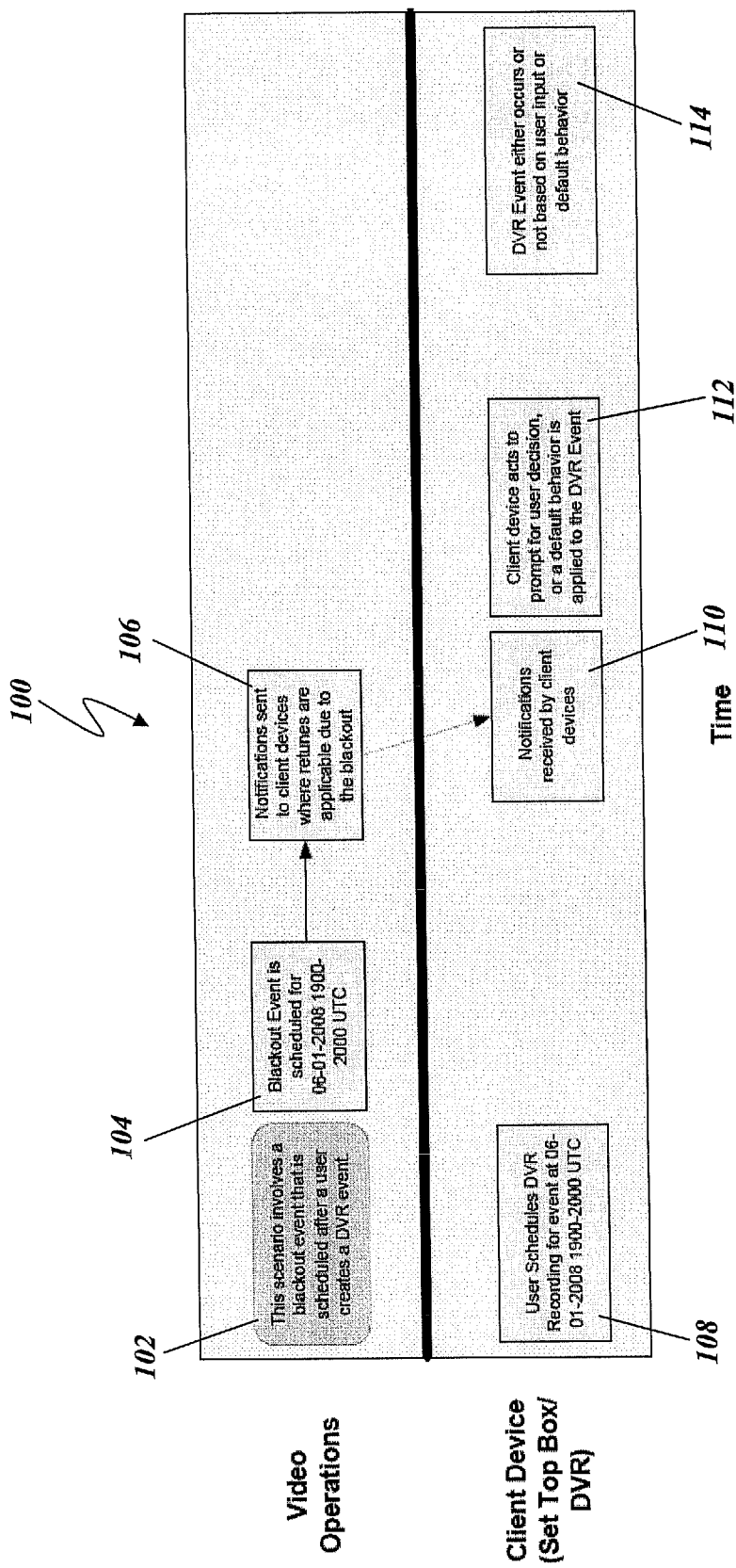
FIG. 1-FIG. 3 depict scenarios which can occur in a particular illustrative embodiment.
Figure 2:
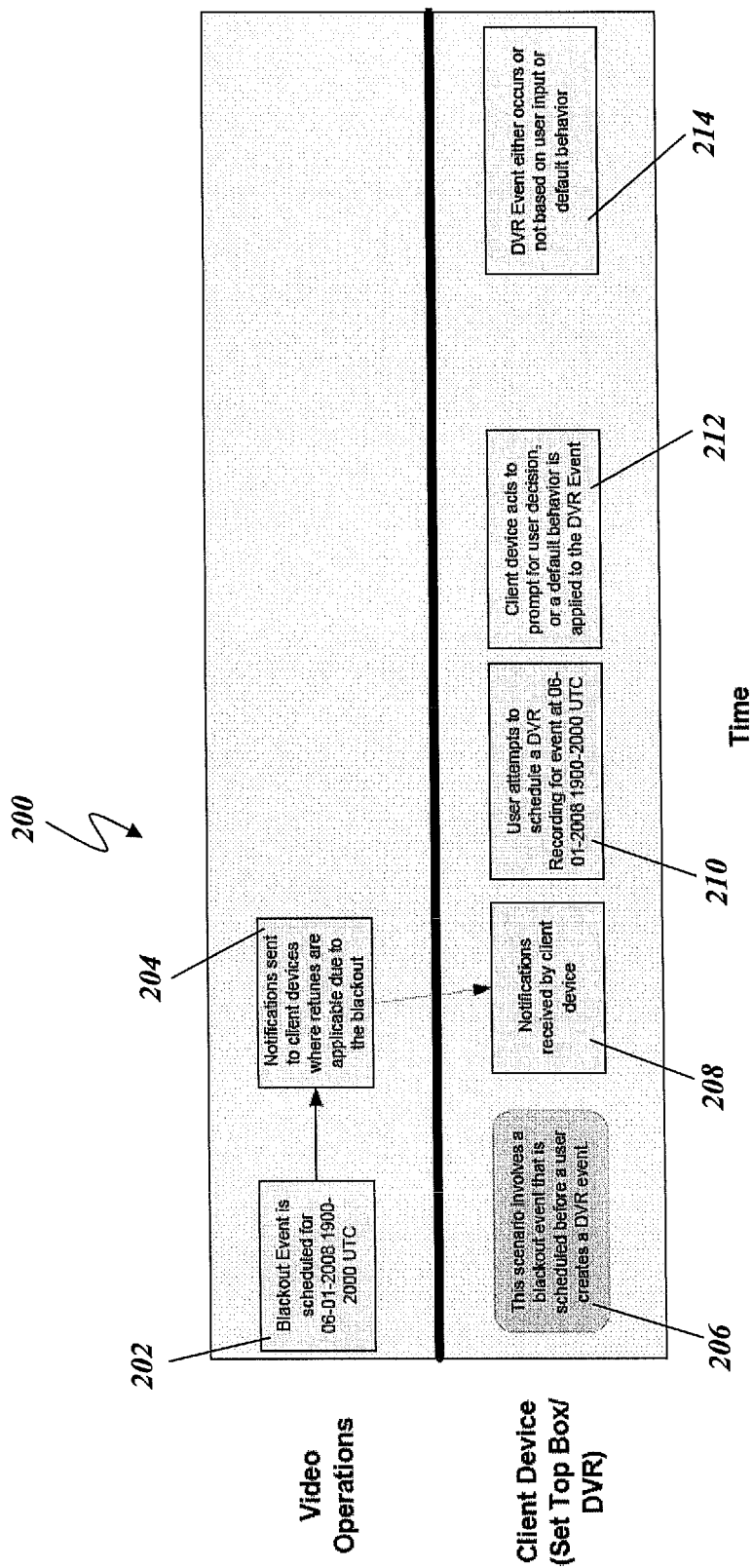
Figure 3:
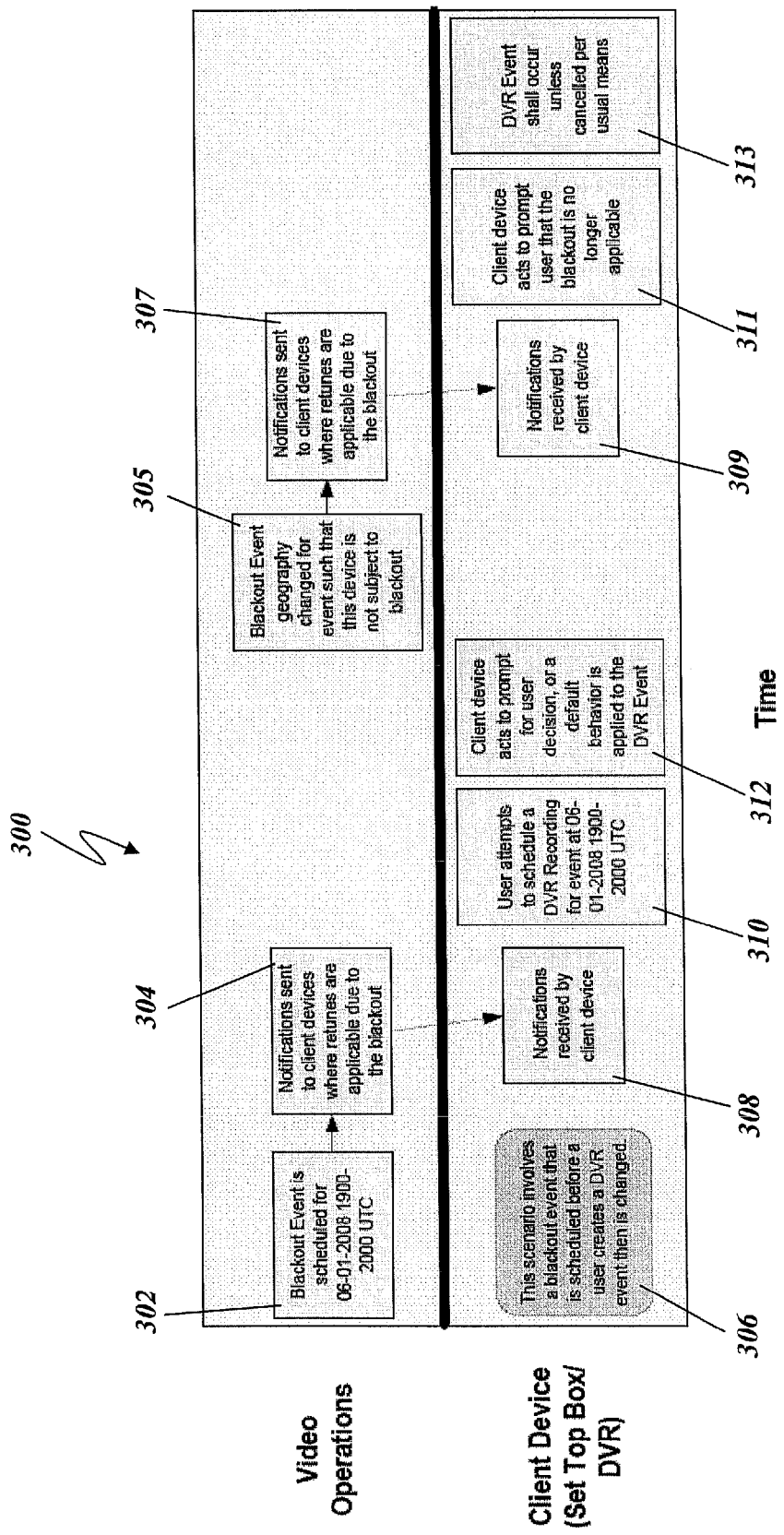

A given subscriber may schedule DVR recordings to occur for programming that has been scheduled for blackout. In order to improve customer experience to reduce the likelihood that the subscriber records either a static JPEG or alternate programming when not intended, the subscriber is prompted to choose whether or not recording the alternate programming is desired when a DVR recording event is to be blacked out. This applies retroactively to scheduled DVR recording events as well as to events that the subscriber is in the process of scheduling. A computer program and system are provided which allow the Set Top Box's DVR system to alert the subscriber that a scheduled DVR Recording Event is subject to blackout and prompts them to choose whether or not to record the alternate programming would reduce the likelihood that unintended recordings are created. This scenario is depicted in FIG. 1. Furthermore, a system and method to alert a subscriber that a potential DVR event is subject to blackout during the scheduling process would allow that subscriber to make a decision about whether or not they should proceed with configuring that event for DVR recording. This scenario is depicted in FIG. 2. Lastly, the system is flexible in that changes to a scheduled blackout event propagate a notification data to the client device, such as an IPTV Set Top Box to alert the subscriber that an event's blackout status has changed or been cancelled. This scenario is depicted in FIG. 3.

In the following description, for purposes of explanation, numerous specific details are set forth in order to provide a thorough understanding of an embodiment of the present invention. It will be evident, however, to one skilled in the art that the present invention may be practiced without these specific details. This disclosure describes a process to link data logged to a video client (set top box) including DVR activity, during a blackout retune event with data logged on the server side and data logged in a provisioning system for the purpose of verifying proper execution of the blackout event for set top boxes including DVR activity located in various geographic locations.

For an Internet Protocol Television (IPTV) system, a software-based blackout system is a novel approach to selectively providing alternate programming in the place of default services for certain geographies based upon content providers' demands. In order to prove to the content providers that the blackout events are having the desired outcome at the client's set top box, a process is provided to analyze reported retune data collected on the set top boxes and map the retune data to event data about the events themselves stored within an electronic data warehouse having mass computer readable medium storage for the data. The client device retune data, in this case an STB retune data, that are logged occur at the time of retune, combining these data with the data stored about the event and the restriction data from the provisioning system can be used to verify that the appropriate service appeared at the time the blackout event was in force.

In an illustrative embodiment, verification of retune data correlated with black out event data is provided to prove that a blackout event has occurred at a given set top box. In illustrative embodiment, retune data collected at the client device in a data distribution network such as an STB. The retune data includes the service switched to and the service switched from along the time of switching. This reported STB retune data is correlated with the collection of related services available for switching during an event (referred to as the substitution collection data) as well as the substitution table version and time and date information with server side data about blackout events to derive an overall snapshot of an outcome of a blackout event. Using account information about the geographic location of the set top box, and the data from the server about the overall blackout event, such as when the blackout started and end in the geographic region, the specific behaviors of a group of STBs in a region subject to a blackout during an event can be determined and matched to the configured specifics of the blackout event.

In another illustrative embodiment a computer readable medium containing computer program instructions data is disclosed, the computer program including but not limited to instructions embedded in the computer readable medium, that when executed by a computer, for managing digital video recording of alternative event data during a blackout of primary event data at a client device, the computer program further including but not limited to instructions to receive input data scheduling a digital video recording for the primary event data; instructions to receive at the client device from a Blackout Management System, notification data indicating blackout of the primary event data; and instructions to present alternative event data for recording on the client device. In another particular embodiment of the medium, the computer program further includes but is not limited to instructions to receive substitution event table data wherein the alternative event data is based on retune locations indicated in the substitution event table data; and instructions to receive user input data indicating selection of an alternative program indicated by the alternative program data and recording the alternative program data indicated by the user input data during the blackout of the primary program data.

In another particular embodiment of the medium, the computer program further includes but is not limited to instructions to perform default digital video recording behavior when no user input data is received, wherein the default digital video recording behavior further includes but is not limited to recording the alternative program data when sufficient storage is available to store the alternative program data on a digital video recorder at the client device. In another particular embodiment of the medium, the computer program further includes but is not limited to instructions to store client digital video recording activity data for the client device to create a user digital video recording data profile for the client device. In another particular embodiment of the medium, the computer program further includes but is not limited to instructions to record the alternative program data when the alternative program data type correlates with the user digital video recording profile. In another particular embodiment of the medium, the computer program further includes but is not limited to instructions to receive notification data indicating blackout of the primary event data; and instructions to present alternative event data at the client device indicating alternative event data available for recording on the client device during the blackout event. that a blackout has been cancelled for the event; and instructions to proceed with recording the scheduled digital video recording for the primary event. In another particular embodiment of the medium, the computer program further includes but is not limited to instructions to graphically present the notification data of the cancelled blackout for the primary event at the client device. In another particular embodiment of the medium, the computer program further includes but is not limited to instructions to aurally present the notification data of the cancelled blackout for the primary event at the client device.

In another particular embodiment a computer readable medium is disclosed containing instructions that when executed by a computer perform monitor digital video recording at a client device for a blackout of a primary event in a data distribution system, the computer program including but not limited to instructions to configure at the data distribution system, blackout event data indicating at least one event criterion data for selecting client devices subject to the blackout event for receiving restricted content data; instructions to configure in a Blackout Management system at the data distribution system, client devices into a client device group subject to the blackout event in accordance with the event criterion data; instructions to configure in the Blackout Management system at the data distribution system, at least one substitution event data table for the client device group; instructions to send notification data to client devices in the client device group indicating that the primary event is subject to a blackout; instructions to send from a Blackout Management system in the data distribution system, restricted content data and the substitution event data table embedded in the restricted content data to each client device in the client device group; and instructions to receive from the client devices in the client device group, digital video recording data indicating digital video recording activity at the client devices in the client device group.

In another particular embodiment of the medium, the digital video recording activity data is selected from the group of data consisting of event start time data, event end time data, and event name data. In another particular embodiment of the medium, the computer program further includes but is not limited to instructions receive at the Blackout Management system, digital video recording activity data from at least one of the client devices in the client device group; and instructions to correlate at the Blackout Management system, the digital video recording activity data to create a digital video recording profile for the client devices.

In another particular embodiment a system is disclosed useful in managing digital video recording of alternative event data during a blackout of primary event data at a client device, the system including but not limited to a processor in data communication with a computer readable medium; and a computer program including but not limited to instructions embedded in the computer readable medium, the computer program further including but not limited to instructions to receive input data scheduling a digital video recording for the primary event data; instructions to receive at the client device, notification data indicating blackout of the primary event data; and instructions to present alternative event data at the client device indicating alternative event data available for recording on the client device during the blackout event.

In another particular embodiment of the system, the computer program further includes but is not limited to instructions to receive substitution event table data wherein the alternative event data is based on retune locations indicated in the substitution event table data; and instructions to receive user input data indicating selection of an alternative program indicated by the alternative program data and recording the alternative program data indicated by the user input data during the blackout of the primary program data. In another particular embodiment of the system, the computer program further includes but is not limited to instructions to perform default digital video recording behavior when no user input data is received, wherein the default digital video recording behavior further includes but is not limited to recording the alternative program data when sufficient storage is available to store the alternative program data on a digital video recorder at the client device. In another particular embodiment of the system, the computer program further includes but is not limited to instructions to store client digital video recording activity data for the client device to create a user digital video recording data profile for the client device.

In another particular embodiment of the system, the computer program further includes but is not limited to instructions to record the alternative program data when the alternative program data type correlates with the user digital video recording profile. In another particular embodiment of the system, the computer program further includes but is not limited to instructions to receive notification data indicating that a blackout has been cancelled for the event; and instructions to proceed with recording the scheduled digital video recording for the primary event. In another particular embodiment of the system, the computer program further includes but is not limited to instructions to graphically present the notification data of the cancelled blackout for the primary event at the client device. In another particular embodiment of the system, the computer program further includes but is not limited to instructions to aurally present the notification data of the cancelled blackout for the primary event at the client device.

In another particular embodiment a system is disclosed useful for monitoring digital video recording at a client device for a blackout of a primary event in a data distribution system, the system including but not limited to a processor in data communication with a computer readable medium; and a computer program embedded in the computer readable medium containing instructions that when executed by a computer configure at the data distribution system, blackout event data indicating at least one event criterion data for selecting client devices subject to the blackout event for receiving restricted content data; instructions to configure in a Blackout Management system at the data distribution system, client devices into a client device group subject to the blackout event in accordance with the event criterion data; instructions to configure in the Blackout Management system at the data distribution system, at least one substitution event data table for the client device group; instructions to send notification data to client devices in the client device group indicating that the primary event is subject to a blackout; instructions to send from a Blackout Management system in the data distribution system, restricted content data and the substitution event data table embedded in the restricted content data to each client device in the client device group; and instructions to receive from the client devices in the client device group, digital video recording data indicating digital video recording activity at the client devices in the client device group.

In another particular embodiment of the system, the digital video recording activity data is selected from the group of data consisting of event start time data, event end time data, and event name data. In another particular embodiment of the system, the computer program further includes but is not limited to instructions to receive at the Blackout Management system, digital video recording activity data from at least one of the client devices in the client device group; and instructions to correlate at the Blackout Management system, the digital video recording activity data to create a digital video recording profile for the client devices.

Turning now to FIG. 1, in a particular illustrative embodiment, a scenario 100 is depicted that involves a blackout event that is scheduled by video operations in the IPTV system by a Blackout Management System after a user has created a DVR scheduled recording event 102. In a particular embodiment, the blackout event is scheduled for Jun. 1, 2008 at 1900-2000 UTC (universal time code) 104. Notification data are sent from the IPTV system Blackout Management system to client device where retune are applicable due to the blackout 106. A shown in FIG. 1, at the client device, in this case an IPTV STB, a user has scheduled DVR recording for the event on Jun. 1, 2008—from 1900-2000 UTC. The client device (STB) receives the notification data 110 from the IPTV Blackout Management System. The client device (STB) displays a prompt on an STB display or initiates a verbal announcement on a sound presentation device at the STB to prompt the user for user selection data including but not limited to data input from a remote control. When no user selection data is received from the remote control at the STB, default behavior is performed and applied to the DVR event 112. Default behavior may include but is not limited to recording the alternative event. In an alternative embodiment, default behavior for the recording of the alternative event occurs only if there is space available on a DVR video data storage medium such as a computer readable medium at the STB DVR. In another alternative embodiment, default behavior for the recording of the alternative event occurs only if the alternative event is a video data and not JPEG data. In another alternative embodiment, default behavior for the recording of the alternative event occurs only if the alternative event fits a user DVR profile for the user, for example if the alternative event is another sporting event for a sports team which the user has previously recorded on the DVR or selected on the IPTV STB. STB and DVR activity is recorded and reported at the STB and the Blackout Management system to create the DVR profile and user profile for previously selected IPTV video data. The DVR recording occurs or not based on the user input or default behavior 114.

Turning now to FIG. 2, a scenario 200 is depicted in which a DVR recording event is at an IPTV STB scheduled 206 prior to the IPTV Blackout Management System scheduling a blackout event. As shown in FIG. 2, a blackout event is scheduled for Jun. 1, 2008 at 1900-2000 UTC 202. Notification data are sent 204 from the IPTV Blackout Management System to client devices (STBs) to which the blackout applies, this is, those STBs where retunes are applicable to the blackout. The STB receives the notification data 208. When a user at an STB subject to the blackout attempts to schedule a DVR recording event for the event subject to the blackout 210 the client device acts to prompt the user for selection input data 212. The client device DVR scheduled event occurs (records) or does not occur based on the user input selection data or performs default behavior as discussed above with regard to FIG. 1.

Turning now to FIG. 3, a scenario 300 is depicted in which a DVR recording event is at an IPTV STB scheduled 302 by the IPTV Blackout Management System before the user at the STB schedules a DVR recording event and then the blackout event is changed by the IPTV Blackout Management System. As shown in FIG. 3, a blackout event is scheduled for Jun. 1, 2008 at 1900-2000 UTC 302. Notification data are sent 304 from the IPTV Blackout Management System to client devices (STBs) to which the blackout applies, this is, those STBs where retunes are applicable to the blackout. The STB receives the notification data 308. When a user at an STB subject to the blackout attempts to schedule a DVR recording event for the event subject to the blackout 310 the client device acts to prompt the user for selection input data 312. The client device DVR scheduled event occurs (records) or does not occur based on the user input selection data or performs default behavior as discussed above with regard to FIG. 1. In this scenario as shown in FIG. 3, the Blackout Management System changes the criterion for selecting STBs to which the Blackout Event applies, for example a geography has such that the STB is no longer subject to the blackout 305. Notification data are sent from the Blackout Management System to the STBs to which retunes are no longer applicable to the blackout 307 and received by the STBs 309 to which retunes are no longer applicable due to the changed criterion for the blackout. In this case, the STB which received the changed blackout notification data, removing the blackout prompts the user at the STB that the blackout is no longer applicable 312. The scheduled DVR event then occurs at the DVR unless cancelled by the user at the STB.

Figure 4:
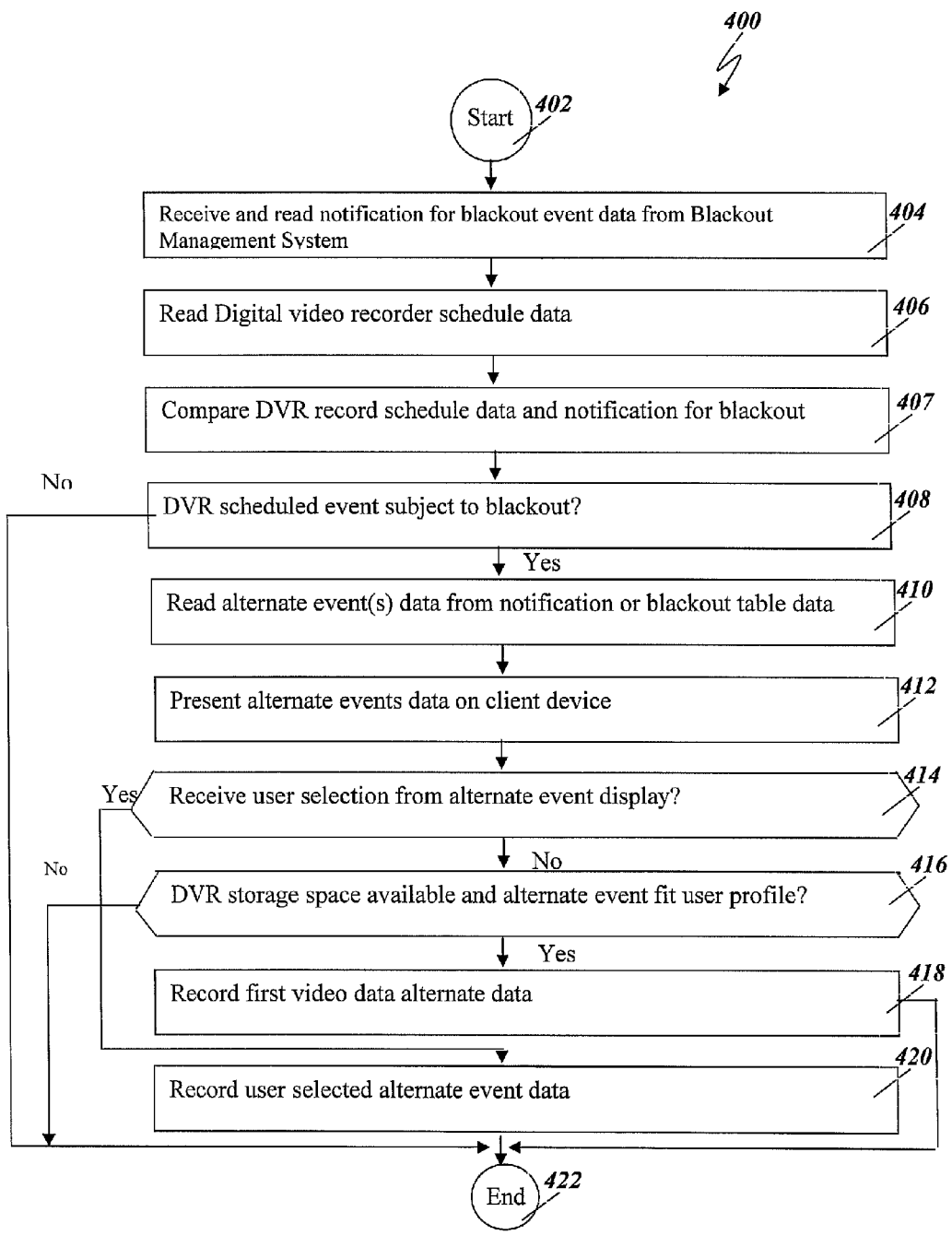
FIG. 4 is a data flow diagram showing an illustrative embodiment of data exchanged and process in a particular illustrative embodiment.

Turning now to FIG. 4, a flow chart of functions performed by an illustrative embodiment is depicted. No order of execution or mandatory steps are dictated or implied by the flow chart 400, as in other embodiments the function shown in FIG. 4 may be executed in a different order or some of the function not executed at all. In an illustrative embodiment, a processor at a client device such as an STB reads a computer program from a computer readable medium and performs the functions shown in FIG. 4. As shown in FIG. 4, the functions execution starts at terminal 402 and proceed to block 404 where a processor at an STB receives and reads notification data which may include an event identifier and event time and a blackout event table data and receives and reads 406 a DVR recording schedule data. At block 407 the STB processor then compares the DVR event data to the blackout event table data and determines if notification data have been received which indicate that the DVR event scheduled for recording is subject to a blackout event according to the blackout event table data. If the scheduled DVR event is not subject to the blackout event data at block 408, the STB processor exits at terminal 422. If the scheduled DVR event is subject to the blackout event data at block 408, the STB processor the STB processor reads alternative events from the blackout event table data at block 410 and displays the alternative events on the STB display at block 412. The STB looks for user selection input data at block 414 and if user selection input data is received at the STB proceeds to block 420 and records the user selected alternate event data. If no user selection input data is received at the STB the processor proceeds to block 416 and performs default behavior as described above. In block 416, if DVR storage is available and the alternate event fits a user DVR or IPTV selection profile the STB records the alternate event at block 418 and exits at block 422.

Figure 5:
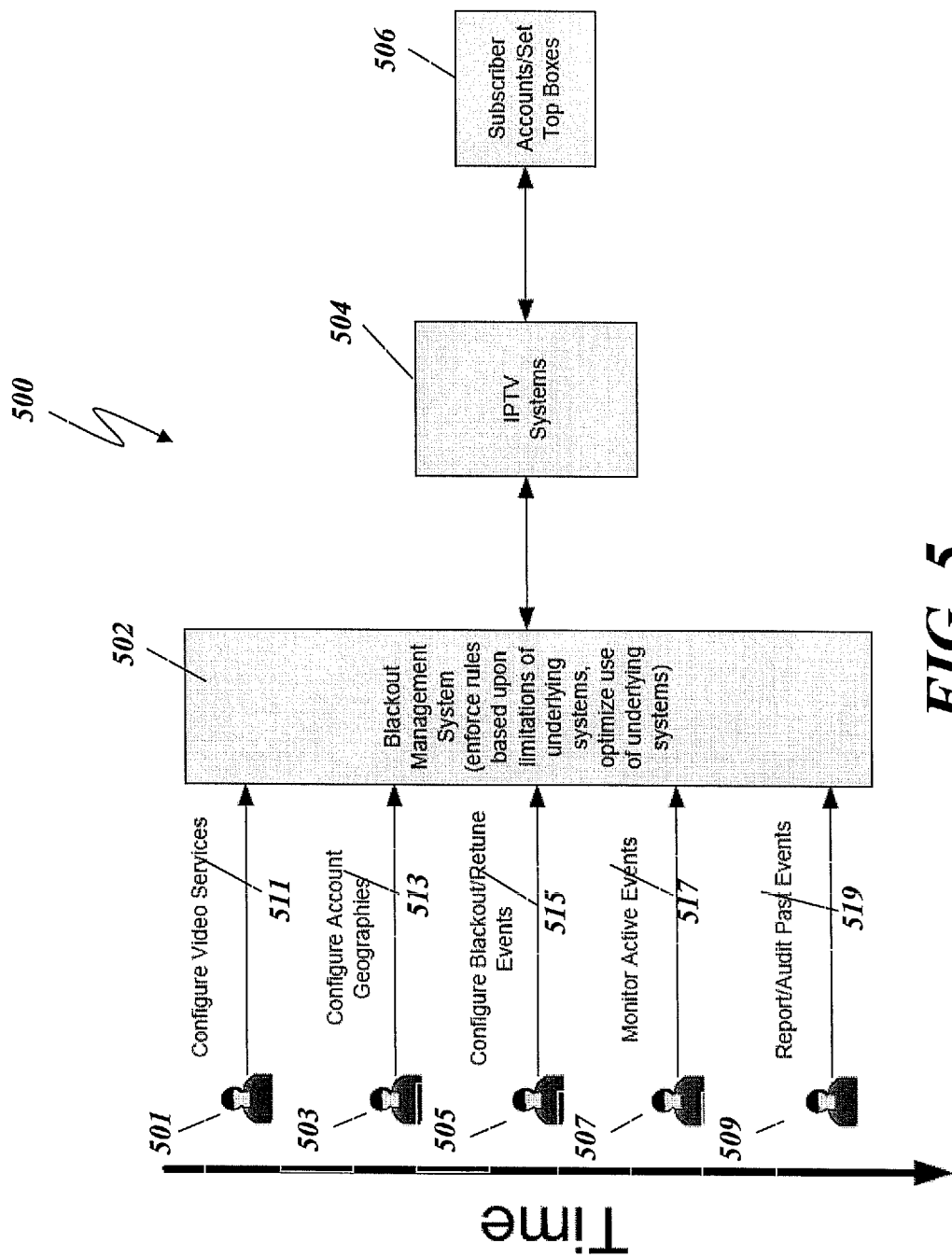
FIG. 5 is a data flow diagram showing an illustrative embodiment of data exchanged and process in a particular illustrative embodiment.

FIG. 5 illustrates a particular example of data flow that occurs to enable management of blackout event data. Turning now to FIG. 5, in a particular illustrative embodiment, an example of a time line and data flow are illustrated for a particular illustrative embodiment. As shown in FIG. 5, a graphical user interface (GUI) or interface to the Blackout Management system is provided via automated software to enable a user to Configure Video Services data 501. Configuring video services data includes but is not limited to defining alternate services which can be accessed when primary video services are not available during a blackout event when conditional access prohibits a viewer from accessing a primary video data feed. Alternate video services are defined to which a client device such as a set top box can be retuned when attempting to access a primary video service during a blackout. The alternate video services are defined as "substitutable" video services which can be substituted for the unavailable primary video service subject to a blackout at the client device. Substitution collections data, which define substitutable video services, are stored in data structures which are embedded in computer readable media and sent to client devices which are subject to a blackout event. Substitutable video services include but are not limited to alternate video feeds which can be accessed via retuning a client device to the alternate video feeds. Substitutable video services can also include JPEG data which can include but are not limited to static images for display on a client display device informing a viewer at the client device that the primary video service is unavailable due to a conditional access blackout. The substitution collections data are sent 511 to a Blackout Management System 502 which forwards the substitution collections data to IPTV systems 504 for distribution to subscriber STBs 506 associated with particular subscriber accounts. The Blackout Management System enforces rules based upon limitations of underlying systems and optimizes use of the underlying systems.

As shown at 503, a particular illustrative embodiment provides a GUI or data interface to the Blackout Management system or automated software that enables a user to configure Account Geographies data in accordance with a requested blackout by a content provider. In a particular illustrative embodiment, client devices, such as STBs are placed into geographic groups, such as zip codes or other geographic criterion. For example, a HOUSTON TEXANS™ Football game, if not sold out, would be unavailable in the Houston, Texans geographic region. Thus, those client devices or STBs in the Houston geographic area would be placed in a group of client devices subject to a conditional access blackout of the HOUSTON TEXANS™ Football game. The data indicating the group of client devices subject to a conditional access blackout of the HOUSTON TEXANS™ Football game are sent to the Blackout Management System, which forwards the Account Geographies data to IPTV systems 504 for distribution to subscriber STBs 506 associated with particular subscriber accounts. Each STB in the group of the STBs subject to the blackout are sent substitution collections data and blackout event substitution table data direct these STBs to retune to an alternate video feed or JPEG as defined in the substation collection and substitution event table.

Continuing with FIG. 5, a particular illustrative a particular illustrative embodiment provides a GUI or data interface to the Blackout Management system or automated software that enables a user to configure Blackout/Retune events data. The Blackout/Retune events data includes but is not limited to defining data for populating a blackout event substitution table data structure. The blackout event substitution data structure includes but is not limited to data sent to STBs instructing the STBs to retune to alternate video feeds or JPEG data during blackout of primary video data at the STBs. The Blackout/Retune events data is sent 515 to the Blackout Management System, which forwards the Blackout/Retune events data to IPTV systems 504 for distribution to subscriber STBs 506 associated with particular subscriber accounts. Continuing with FIG. 5, a particular illustrative a particular illustrative embodiment provides a GUI or data interface to the Blackout Management system or automated software that enables a user to monitor active events.

Figure 6:
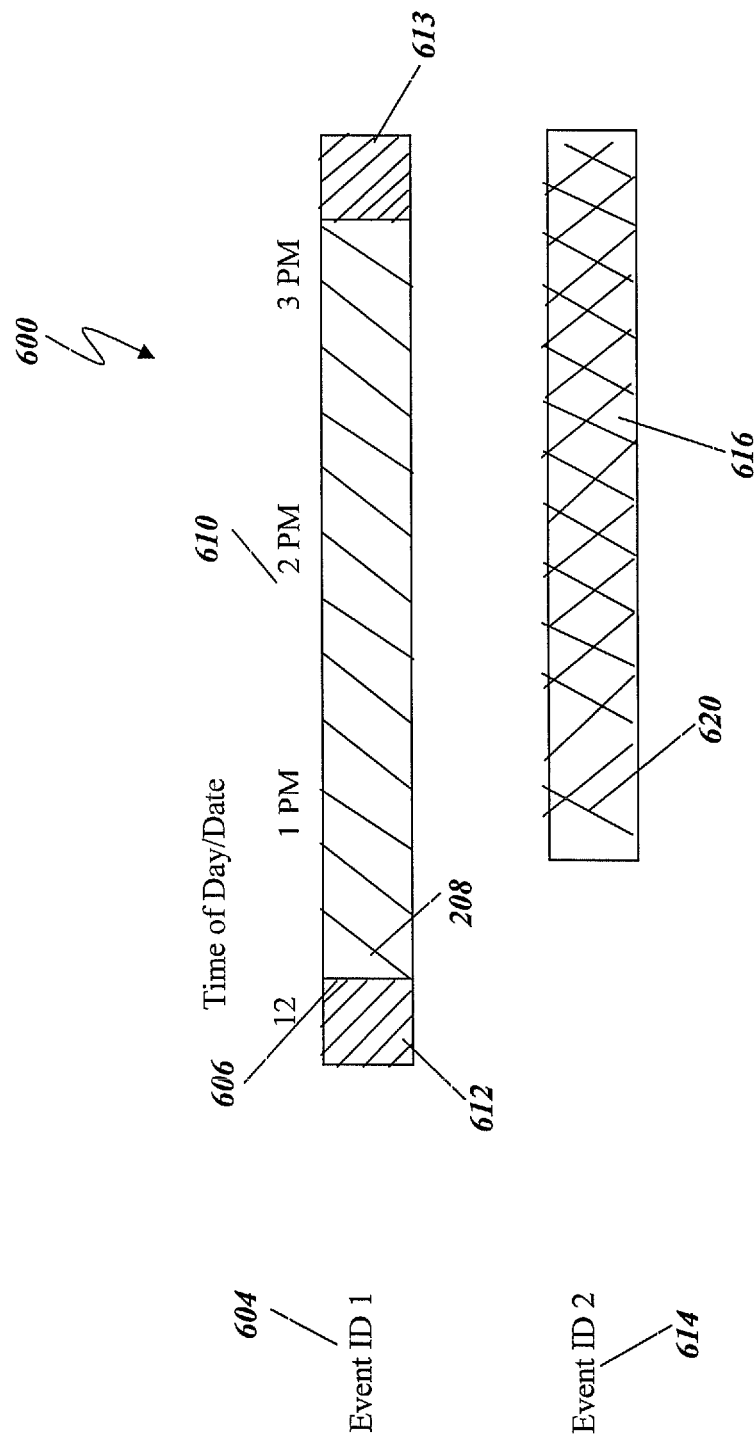
FIG. 6 is a depiction of a graphical representation of status for black out events.

Turning now to FIG. 6, as shown in FIG. 6, a graphic depiction 600 of color coded events 604 and 614 are presented showing status of the selected blackout events. The events are identified by event identifiers 604 and 614. A color coded bar showing the status of the event along with the time of day scale 610. Status includes but is not limited to start time, end time and expiration warnings. For example, a HOUSTON TEXANS™ football game, event 1 in FIG. 6, which is subject to a blackout would be displayed initially on the graphical display showing a scheduled start time (noon) and end time (3:30 PM), for example noon to 3:30 PM on a Sunday. The black display can begin flashing 612 off and on five minutes before the blackout is scheduled to start in order for an operator to ensure that the blackout event data is accurate and to make last minute adjustments to the blackout event data. The game schedule could be displayed in black prior to the start of the game and displayed in green when the game starts. The green display can begin flashing 613 five minutes before the blackout is scheduled to expire. If the end of the game is delayed for overtime, an operator can extend the blackout until the game is over by making changes to the blackout event substitution table data reflected in the Monitor/Active events data. The Monitor/Active events data is exchanged 117 with the Blackout Management System, which forwards the changes in blackout event substitution data and associated changes in data to IPTV systems 104 for distribution to subscriber STBs 106 associated with particular subscriber accounts.

Continuing with FIG. 5, a particular illustrative a particular illustrative embodiment provides a GUI 509 or data interface to the Blackout Management system or automated software that enables a user to Report/Audit Past events to verify that the blackout events occurred as requested by the content provider. The Report/Audit Past events data includes but is not limited to geographic data, retune data and event data as discussed below. The Report/Audit Past events data is exchanged with the Blackout Management System, which exchanges the Report/Audit events data with IPTV systems 504 and subscriber STBs 506 associated with particular subscriber accounts.

Figure 7:
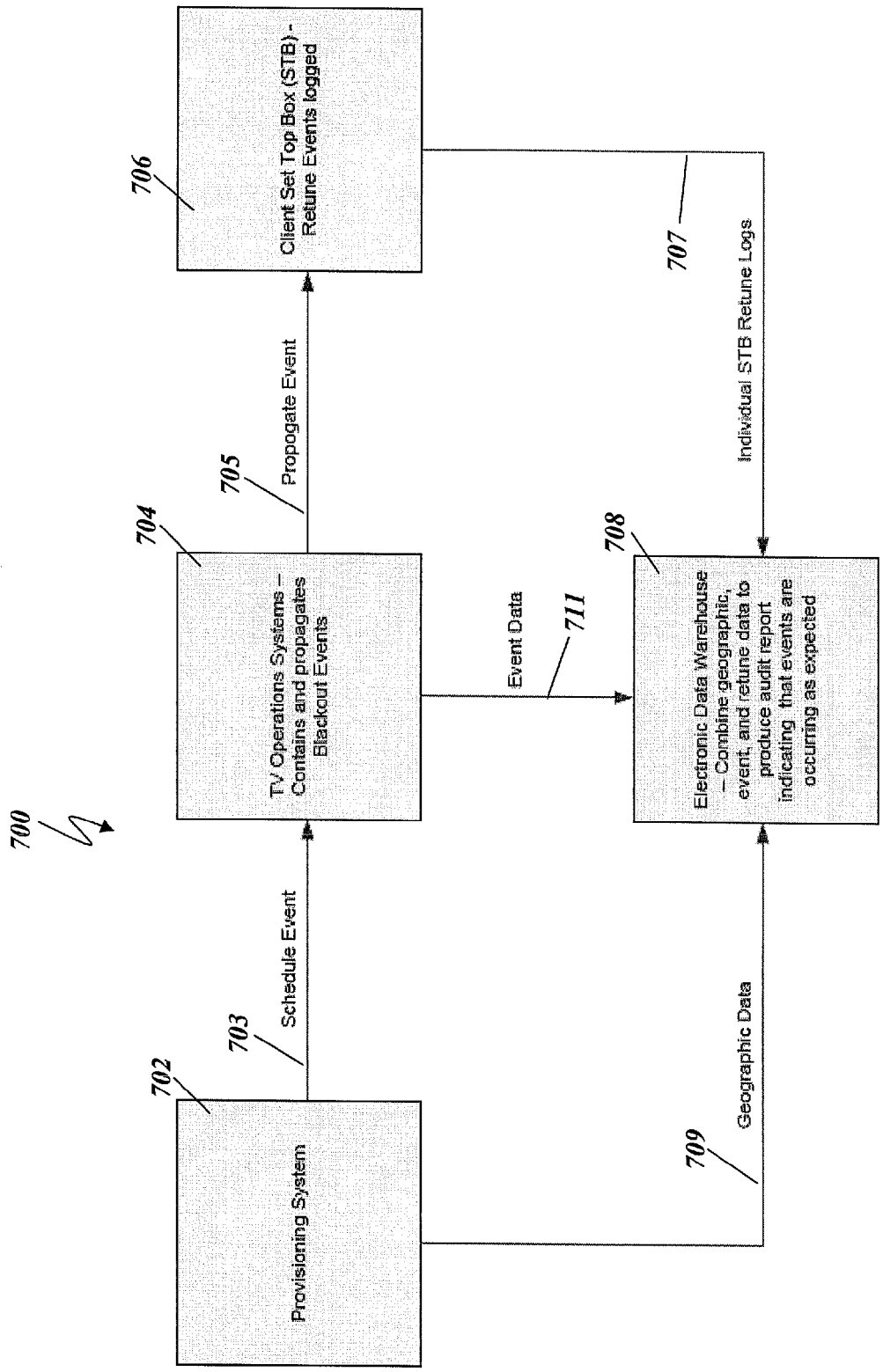
FIG. 7 is a data flow diagram showing an illustrative embodiment of data exchanged and process in a particular illustrative embodiment.

FIG. 7 illustrates a particular example of data flow that occurs to enable verification and audit of blackout event data for the purpose of determining the client side outcome of scheduled blackout events. Turning now to FIG. 7, in a particular illustrative embodiment, data flow diagram 700 provides for verification of a conditional access event such as a blackout. As shown in block data flow diagram 700, a provisioning system 702, for example a Service Delivery Platform (SDP) sends schedule event data 703 to TV Operations System 704 which contains and propagates Blackout Events data. TV Operations system 704 at a Super Head Office (SHO) in an internet protocol television (IPTV) system and sends or propagates event data 705 to a client device, such as STB 706. The STB 706 logs retune event data in an Individual STB Retune Log and sends the Individual STB Retune Log data 707 to an Electronic Data Warehouse (EDW) 708. Provisioning system 702 (SDP) sends geographic data to the EDW. TV Operations Systems 704 at the SHO sends Event Data 711 such as event start and end time to the EDW. The EDW combines the geographic, event data and retune data to produce an audit report verifying that conditional access black out events occurred as expected, that is, verifying that the retune event occurred as expected at the client device level as requested by a content provider.

Figure 8:
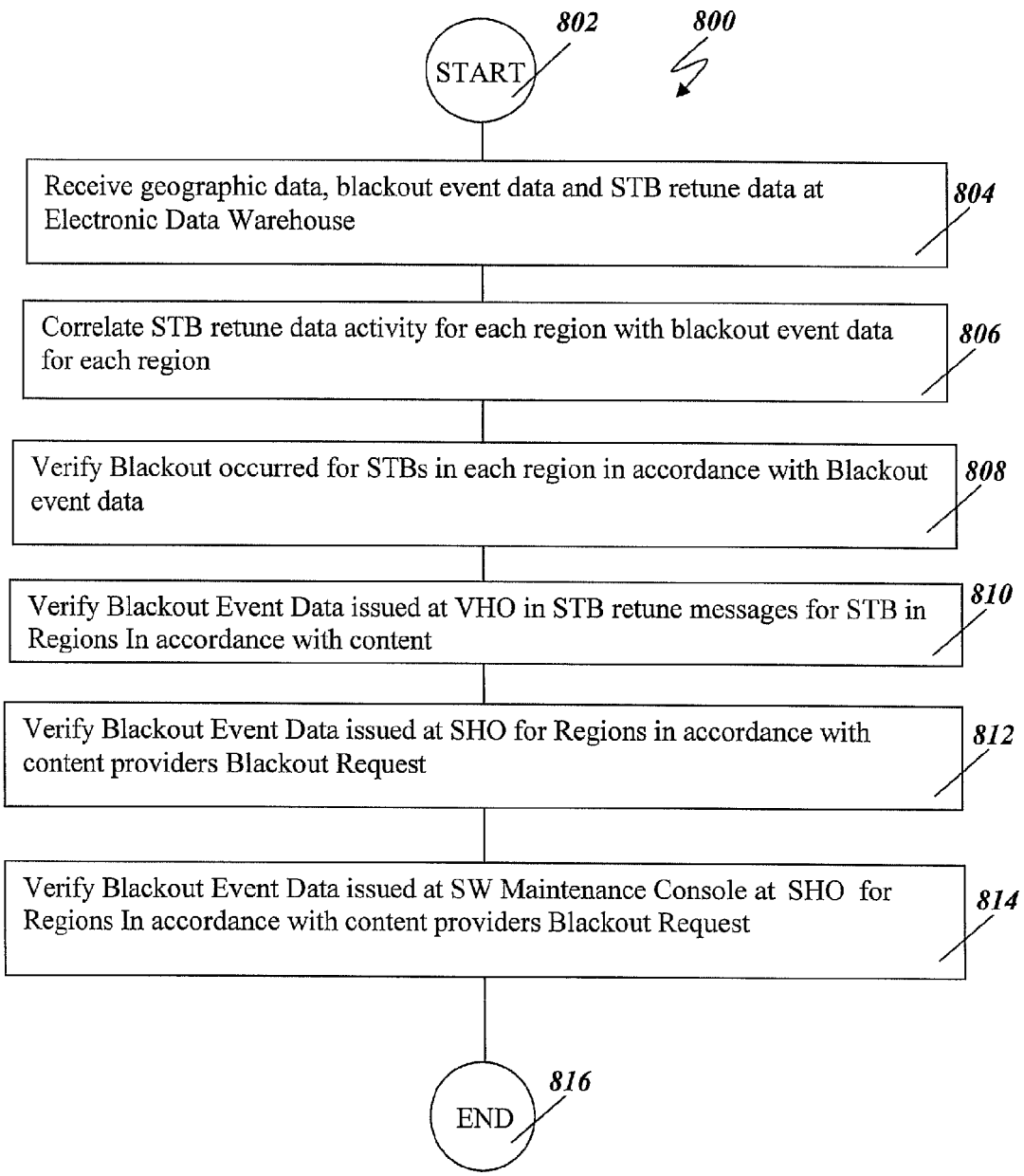
FIG. 8 is a flow chart depicting functions performed in an illustrative embodiment.

Turning now to FIG. 8, a flow chart is depicted for functions performed in an illustrative embodiment. No particular order is dictated by the arrangement of functions shown in FIG. 8. Some of the functions may be excluded from or executed in a different order in other embodiments. In a particular illustrative embodiment, function performance initiates at terminal 802 and proceeds to block 804 in which an EDW receives geographic data; blackout event data and STB retune data, all of which are stored in a mass computer readable media at the EDW. At block 806 an EDW processor at the EDW correlates the STB retune data with blackout event data for each geographic region. At block 808 the EDW processor then verifies that the blackout occurred for STBs in each geographic region in accordance with the blackout event data for each geographic region. In another particular embodiment, STB can be subject to black out based on another criterion, such as a demographic restriction. For example, all STBs associated with subscribers in a particular demographic group, such as income over $100,000.00 will be shown a primary video feed on channel 1 and all STBs all STBs associated with subscribers in another particular demographic group, such as income under $100,000.00 will be retuned under the black out data to a secondary video feed on channel 1 during a particular financially oriented program.

Returning to the geographic blackout example of FIG. 8, at block 810 the EDW processor then verifies the blackout event data issued at the SHO. The SHO event data is sent in STB retune messages sent to STBs in geographic regions where content providers have requested a blackout event. For example, the DALLAS COWBOYS™ football game may be blacked out in Dallas, Tex. when the game is not sold out within 72 hours before kickoff, according to a request by a content provider (i.e., the National Football League). In this case, STBs associated with viewers in Dallas would receive retune instructions in the form of substitution event table data. The substitution event table data are embedded in the content from the NFL. The substitution event table defines alternate events for STBs in the Dallas geographic region during the Cowboys game and instructs the STBs in the Dallas geographic region to retune to another video data feed during the Dallas Cowboys football game. Thus, when viewers in Dallas tune to the Dallas game, STBs associated with the Dallas viewers are retuned to another football game, such as the OAKLAND RAIDERS™ football game on an alternate video feed on the at the same tuner location or channel. The retuning activity during the Dallas game is logged at the STBs associated with the Dallas viewers. A special code is used indicating that the retuning occurred in accordance with the substitution event table to differentiate the retuning activity from voluntary retuning such as channel surfing by the viewer.

At block 812 the EDW verifies blackout event data issued at the SHO for regions in which content providers have requested a blackout event. For example, client STBS associated with the viewers in Dallas would receive retune message data, including but not limited to the substitution event table data, in video content data received when the viewers tuned their STBs during the DALLAS COWBOYS game to the IPTV channel on which the DALLAS COWBOYS™ game is scheduled to be presented. STBs associated with these viewers store STB retune data with a code indicating that the STB retune was associated with black out event data and occurred at a particular time. STB retune activity initiated by the viewer, such as channel surfing or other voluntary changing channels are coded with a different identifier than retune data associated with a blackout event. Thus, the option is presented to report all STB retune data or only STB retune data associated with a blackout event upstream to the EDW.

STBs report retune activity data (also referred to herein as "retune data") to the EDW to indicate what retuning activity (changing channels activity or retuning to another video feed activity) viewers performed when presented with retune message data during the DALLAS COWBOYS™ game. The EDW receives the retune activity data from the STBs. The retune activity data is correlated or compared with the blackout event data for the Dallas region to verify that STBs tuned during the COWBOYS game to the channel on which the DALLAS COWBOYS game was presented retuned to alternate video feed on the same channel or tuner position feed to view alternate programming. At block 814 the EDW processor verifies the occurrence of the blackout event at the client device level for regions in which content providers have requested a blackout event. In a particular illustrative embodiment the process ends at terminal 816.

Figure 9:
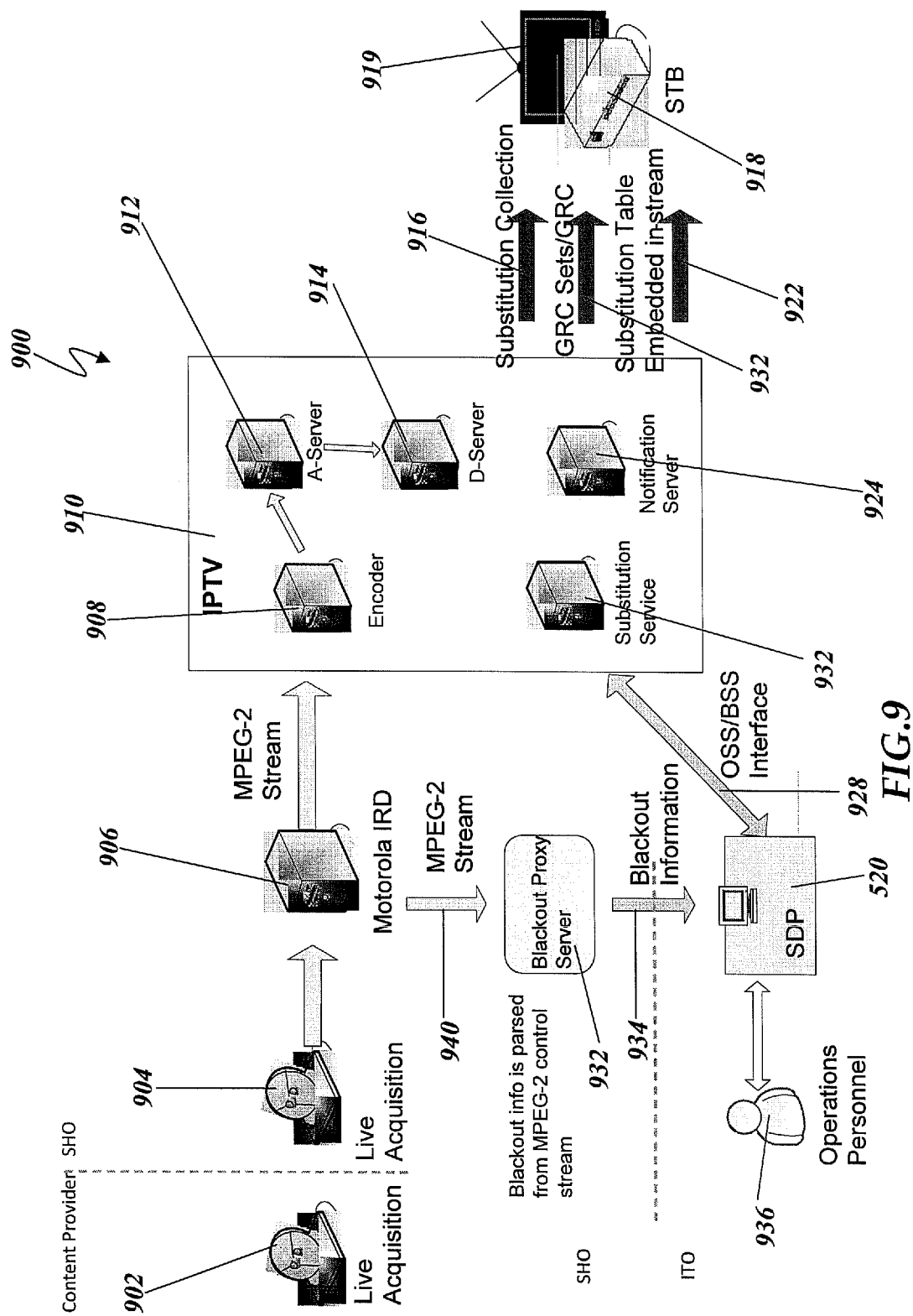
FIG. 9 is overview schematic depiction of an architectural diagram of a particular illustrative embodiment.

Turning now to FIG. 9, an architectural overview is depicted in FIG. 9. In particular illustrative embodiment, acquisition services 944 comprises a content provider 902 that provides live data from acquisition of video data at a live event such as a foot ball game. The content provider passes the live acquisition video data to a live acquisition element 904 at a SHO in an IPTV system 940. The SHO passes the live video data received from the content provider to an integrated receiver/decoder (IRD) 906. The IRD encodes the live video data in an MPEG-2 video data stream and sends the MPEG-2 video data stream to a down stream IPTV server encoder 908 in an IPTV system node such as a VHO and to a blackout proxy server 910 in video operations 910.

The blackout proxy server parses blackout event information from the MPEG-2 video data stream. The blackout proxy server sends the blackout event data to the SDP 1130. Operations personnel or a processor at the SDP analyzes the event data and creates geographic restriction codes (GRCs) defining geographic regions for viewers, GRC sets for different content providers and substitution collection data defining what services or feeds can be substituted for the event in each region. The SDP sends the blackout data including but not limited to substitution collection data, GRC sets/GRC data and substitution event table data to the IPTV system. The IPTV system then sends the black out data to appropriate STBs. The IPTV system encodes the blackout information into the video data stream for those STBs which are in geographic areas subject to the blackout.

In another embodiment, STBs subject to the blackout are selected upon criteria different than geographic location criteria, such as demographics criteria. The substitution service forms a substitution event table and embeds the substitution event table data in content sent to the STBs. The substitution table data are embedded in the video data stream and sent to the STBs. Each STB stores retune activity data in retune data logs which are collected by the IPTV system during substitution collection. The retune event data logs are sent upstream to the EDW where the EDW processor correlates the retune log data with blackout events in each region for each event subject to a blackout.

Turning now to FIG. 10, a substitution event table data structure 1000 containing data embedded in a computer readable medium is illustrated. The substitution table data structure is generated and populated with blackout event data in a particular illustrative embodiment. The substitution event data embedded in the substitution event table data structure illustrated in FIG. 10 are sent to each STB in content data during a blackout event. Restricted content is available for viewing at client devices meeting a certain criterion, including but not limited to geography criterion data and demographic criterion data. The substitution event table data are embedded into the restricted content data sent to the STBs. In the current example, as shown in FIG. 10, an STB in a Grouping/Geography/GRC 1 which is subject to a scheduled black out event is retuned to SPNc when tuning to geographically restricted content data on SPN2. As shown in FIG. 10, services provided on IPTV channels (which need not be dedicated channels as the channel selection/tuner position may vary) are listed in rows of the data structure. In the present example, services SPN1 1002, SPN2 1006, SPNa 1008 and SPNc 1010, etc are listed across the rows of the substitution event table. Columns in the substitution event table indicate GRC 1004 numbers such as GRC 1 1006. In the present example, an STB in GRC 1 will be retuned to SPNc 1011 after initially tuning to SPN2. Event description data including but not limited to substitution event table version number 1012, event start time 1014, GRC set number 1016 for a particular content provider and event signature 12346 1018. The GRCs define different geographic regions. Different content providers can have different GRC sets and different GRCs. For example, a GRC set can be defined for a provider, such as, a GRC code of 1 can be assigned to Chicago, Ill. and a GRC code of 2 can be assigned to San Antonio for the particular content provider. Another content provider can define a different GRC set having a 1 for Atlanta and a 2 for Los Angeles.

Figure 11:
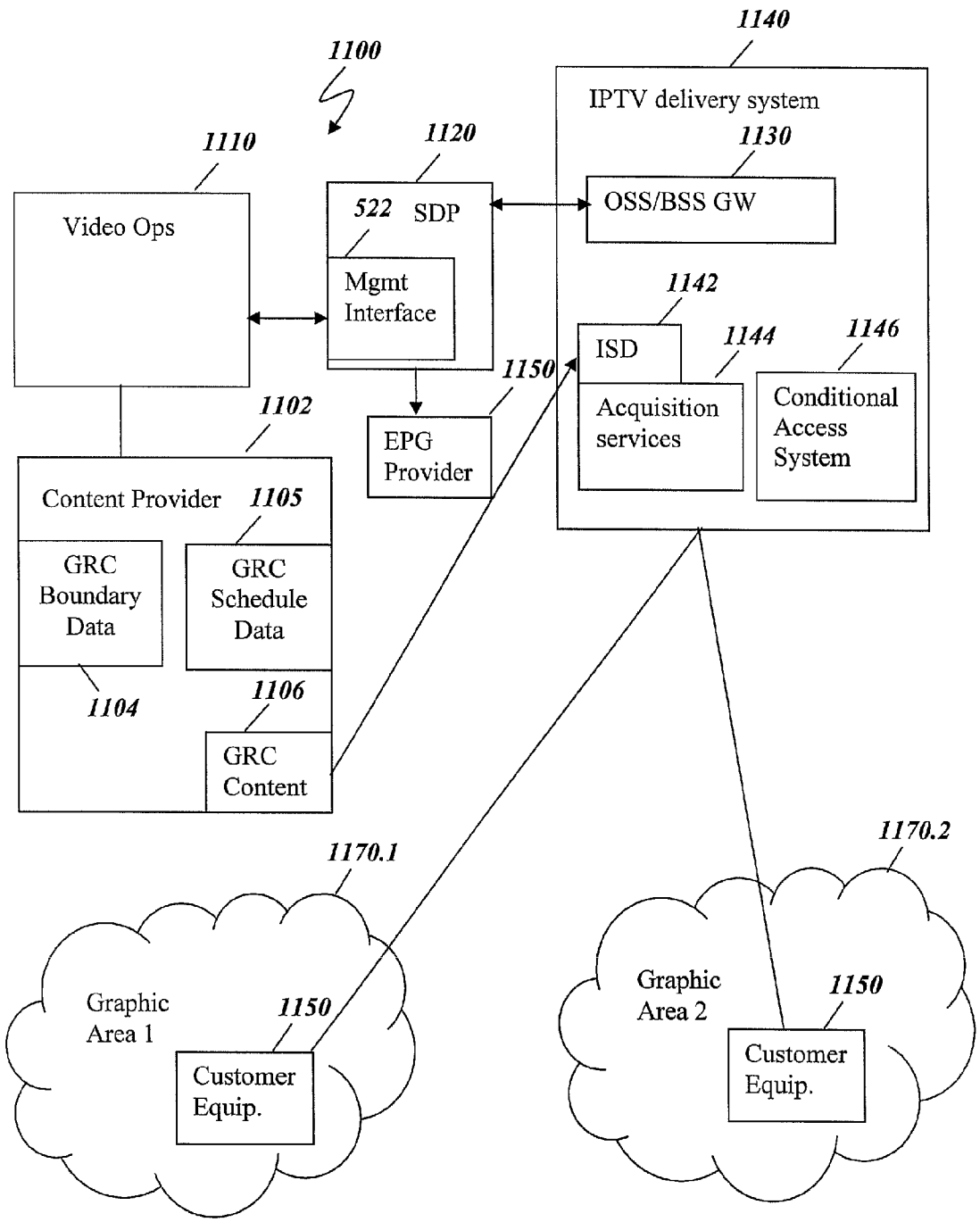
FIG. 11 is a block diagram of a system for geographically restricting content in accordance with an example embodiment.

Referring to FIG. 11, an example embodiment of a system 1100 for providing blackouts for geographically restricted content data is illustrated. In a particular illustrative embodiment, the system 1100 includes but is not limited to a content provider 1102, a video operations unit 1110, a service delivery platform (SDP) 1120 and IPTV delivery systems 1140. Content provider 1102 may be any entity that provides content that may need to be geographically restricted. Examples of such content providers include movie or television content providers, sporting event content providers, musical content providers and the like.

In an example embodiment, the content may include media such as video content data in the form of a live sporting event, a special run movie or television program and digital music content such as an MP3 file. In an example embodiment, the content may include data such as a video game and/or patch file. In an example embodiment, the content data may include informational content data. It should be appreciated that other types of content data may be used with the system 1100. Content providers 1102 may define and maintain Restricted Content (RC) such as geographic boundary data 1104 for geographically restricted content and schedule data 1106 for the RC. In some embodiments, RC boundary data may be defined in terms of zip codes. For example, 3-digit zip, 5-digit zip, or zip+4 codes may be used. In alternative embodiments, other geographic location mechanisms may be used. For example, the geographical boundaries may be defined in terms of a radius from a center point. The embodiments are not limited to a particular system or method of defining a geographical boundary.

RC schedule data 1106 comprises a list of blackout events and times for the blackout events. Video operations unit 1110 receives the RC boundary data 1104 and RC schedule data 1106 and uses the data to provide content blackout data to SDP 1120. SDP 1120 may comprise one or more systems involved with service provisioning, including services related to providing geographically restricted content. In some embodiments, SDP 1120 includes a management interface 1122 that is used to input content blackout data. In some embodiments, management interface 1122 is a graphical user interface. In alternative embodiments, management interface may be a communications interface that receives input data directly from one or more systems.

In another particular embodiment, an IPTV system 1140 may include various servers and systems involved in the delivery of IPTV services to end users having customer equipment 1150 in various geographic areas 1170. In some embodiments, IPTV system 1140 includes OSS/BSS gateway 1130, acquisition services 1144, and conditional access module 1146. In some embodiments, the OSS/BSS gateway 1130 includes operation systems and support (OSS) data, as well as billing systems and support (BSS) data. In one embodiment, the OSS/BSS gateway can provide or restrict access to an OSS/BSS server that stores operations and billing systems data. SDP 1120 forwards blackout event data to OSS/BSS gateway 1130 of IPTV system 1140. OSS/BSS gateway 1130 may store the blackout data and/or forward the blackout data to other systems within IPTV system 1140, such as conditional access module 1146.

Acquisition services 1144 include one or more systems that receive content from content providers. Acquisition services 1144 receive the content through one or more IRDs 1142 associated with the content provider. In some embodiments, an IRD (main and backup) is provided at the SHO for each content provider (e.g. ESPN). An additional IRD (main and backup) for each alternate channel to support the blackout/market protection requirements of the content provider may be used. It should be noted that only one set of one or more IRDs need be used to provide service on a national basis, and that individual IRDs need not be deployed for individual geographic areas 1170.

The content may be organized as channels providing services, where a service is a stream of video content data. A channel may include one or more services. For example, channel may include a picture-in-picture (PIP) stream and a full screen video stream. A content provider may provide multiple channels, including primary content, secondary content, and one or more channels of substituted content. Primary content is content that may be subject to a blackout event. Secondary content may be content associated with the primary content, such as advertising content related to the primary content. Substituted content is content that may be substituted for the primary content in the event that the primary content is subject to a blackout restriction.

Conditional access module 1146 uses the GRC data received by OSS/BSS gateway 1130 to determine the content that may be delivered to customer equipment 1150 in geographic areas 1170.1 and 1170.2. As noted above, geographic areas 1170.1 and 1170.2 may be represented in GRC data as a list of one or more zip codes that are to be included in the geographic area. Conditional access module may be a software component of another IPTV service, or it may be a standalone service within IPTV system 1140.

As IPTV system 1140 receives requests for content from customer equipment 1150, such a client STB, conditional access module 1146 determines if the requested content is subject to a blackout for the geographic area where customer equipment 1150 exists, based on the GRC data received by OSS/BSS gateway 1130. If the requested content is subject to a blackout event based on the blackout schedule and GRC data, conditional access module causes the IPTV system 1140 to prevent the requested primary content from being sent to the customer equipment. In this event, IPTV system 1140 may be configured to provide an on screen display (OSD) informing the viewer that the primary content data is unavailable, that is, "blacked out." The OSD may provide a list of one or more video streams, video feeds of substituted content data or JPEG data that may be available. Alternatively, IPTV system 1140 may be configured to automatically provide substitute content data to the requesting customer equipment 1150.

Customer equipment 1150 may be any type of equipment capable of receiving IPTV streams. For example, customer equipment 1150 may be an STB or a computer capable of decoding IPTV streams. It will be appreciated from the above that a zip code level of granularity in defining a blackout area may be achieved in some embodiments. For example, geographic area 1170.1 may be defined as including only one zip code, and geographic area 1170.2 may also be defined as including only one zip code. Primary content may be blacked out in geographic area 1170.1 while allowed in geographic area 1170.2. In another embodiment, STB, telephone area code or neighborhood granularity may be enforced during a black out event based on demographic data for viewers associated with individual STBs or STBs in a particular telephone area code or neighborhood. In some embodiments, SDP 1120 may also provide blackout event data to an Electronic Program Guide (EPG) provider 1180 which provides for the dynamic update of EPG data as blackout events are created, started, and ended.

Figure 12:
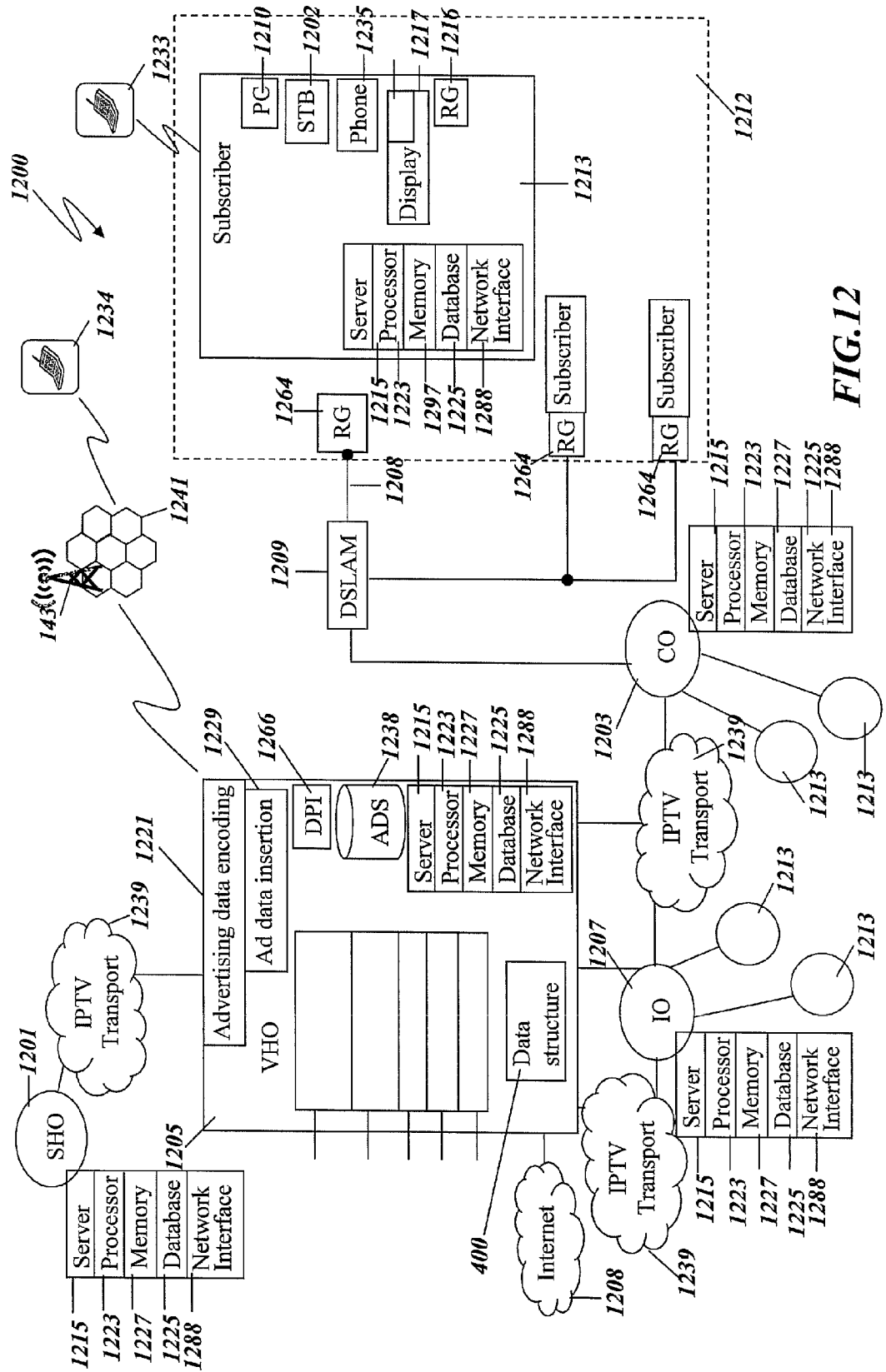
FIG. 12 depicts an illustrative embodiment of an internet protocol television (IPTV) system.

Turning now to FIG. 12, an illustrative embodiment of an IPTV system 540 is depicted. In an illustrative IPTV system, 540 delivers video data including but not limited to video data content and advertising data to subscriber households 1213 and associated end user devices (also referred to herein as subscriber or client devices) which may be inside or outside of the household. The video data further includes but is not limited to blackout event data and substitution table data.

In the IPTV system, IPTV video data on IPTV channels are first broadcast in an internet protocol (IP) from a server at a super hub office (SHO) 1201 to a regional or local IPTV video hub office (VHO) server 1203, to an intermediate office (IO) server 1207 and to a central office (CO) 1203. The IPTV system 1200 includes a hierarchically arranged network of servers wherein a particular embodiment the SHO transmits video and advertising data to a video hub office (VHO) 1203 and the VHO transmits to an end server location close to a subscriber, such as a CO server 1203 or JO 1207. In another particular embodiment, each of the SHO, VHO, CO and IO are interconnected with an IPTV transport 1239. The IPTV transport 1239 may consist of high speed fiber optic cables interconnected with routers for transmission of internet protocol data. The IPTV servers also provide data communication for Internet and VoIP services to subscribers.

Actively viewed IPTV video data on IPTV channels are sent in an Internet protocol (IP) data multicast group to access nodes such as digital subscriber line access multiplexer (DSLAM) 1209. A multicast for a particular IPTV channel is joined by the set-top boxes (STBs) at IPTV subscriber homes from the DSLAM. Each SHO, VHO, CO, IO and STB includes a server 1215, processor 1223, a memory 1227, network interface 1288 and a database 1225. The network interface functions to send and receive data over the IPTV transport. The CO server delivers IPTV, Internet and VoIP content to the subscriber via the IO and DSLAM. The television content is delivered via multicast and television advertising data via unicast or multicast depending on a target television advertising group of end user client subscriber devices to which the advertising data is directed.

In another particular embodiment, client devices, also referred to herein as end user devices, are different stationary and mobile devices, including but not limited to, wire line phones 1235, portable phones 1233, lap top computers 1218, personal computers (PC) 1210 and STBs 1202, 1219 communicate with the communication system, i.e., IPTV system through residential gateway (RG) 1264 and high speed communication lines such as IPTV transport 1239. In another particular embodiment, DPI devices 1266 inspect data VoIP, Internet data and IPTV video, commands and Meta data (multicast and unicast) between the subscriber devices and the IPTV system severs.

In another particular embodiment, the end user devices or subscriber devices include but are not limited to a client user computer, a personal computer (PC) 1210, a tablet PC, a set-top box (STB) 1202, a Personal Digital Assistant (PDA), a cellular telephone 1234, a mobile device 1234, a palmtop computer 1234, a laptop computer 1210, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. In another particular embodiment, a deep packet inspection (DPI) device 1224 inspects multicast and unicast data, including but not limited to VoIP data, Internet data and IPTV video, commands and Meta data between the subscriber devices and between subscriber devices and the IPTV system severs.

As shown in FIG. 12 STB groups 1212 (comprising a group of subscriber house holds 1213) receive multicast advertising data and advertising data keys in video data stream from IO server 1207 via CO 1203 and DSLAM 1209 at STB 1202. In another particular embodiment, each STB is configured to perform DVR functionality using memory, processor and data base on board the STB. Individual households 1213 receive GRC data and substitution event table data at set top box 1202 or one of the other client devices. More than one STB (see STB1 1202 and STB2 1219) can be located in an individual household 1213 and each individual STB can receive a separate multicast or unicast advertising stream on IPTV transport 1239 through DSLAM 1209. In another particular illustrative embodiment separate and unique advertising data are displayed at each set top box (STB) 1202, 1219 tailored to target the particular subscriber watching television at that particular STB. Each STB 1202, 1219 has an associated remote control (RC) 1216 and video display 1217. The subscriber via the RC selects channels for a video data viewing selection (video programs, games, movies, video on demand), initiates trick play commands data to the STB/DVR and places orders for products and services over the IPTV system 1200.

Figure 13:
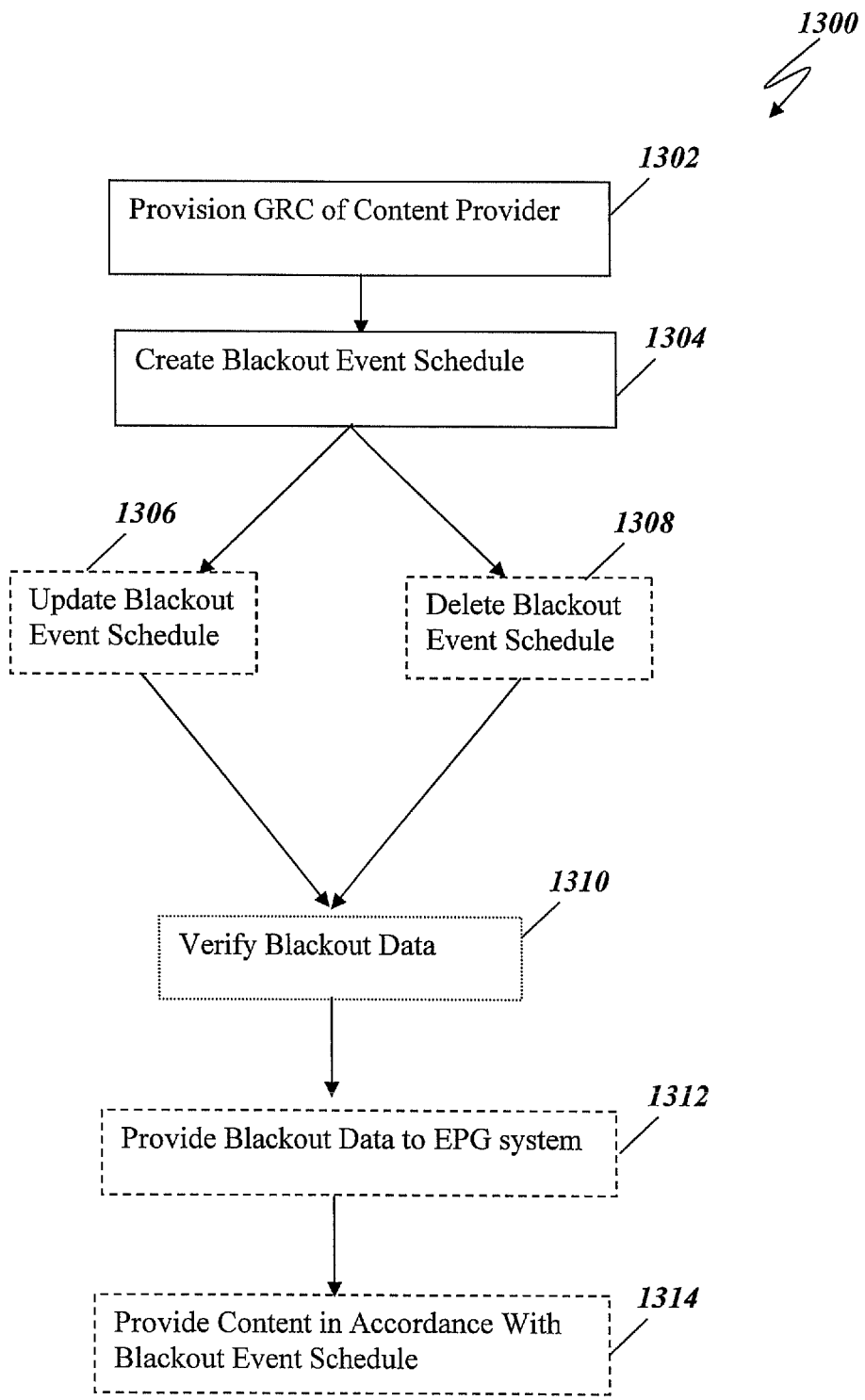
FIG. 13 is a flowchart illustrating an example embodiment for providing geographically restricted content.

Referring to FIG. 13, a flowchart illustrating a particular system and method 1300 in accordance with an example embodiment for providing geographically restricted content data is shown. The method begins at block 1302 by provisioning geographically restricted content data for a content provider. In some embodiments, a GRC user interface at the SDP is used to input data regarding geographically restricted content data into a service delivery platform. The data may include boundary data as defined by a content provider. Provisioning GRC data for a content provider may include initializing GRC data in a substitution event table data structure for a content provider or updating GRC data that has been previously entered.

A blackout schedule is created at block 1304. The blackout schedule comprises a list of blackout events for a content provider. In some embodiments, SDP 520 reads a list of packages and services for each blackout channel and creates a blackout event and substitution event table data structures describing the blackout event. Further details on creating a blackout schedule are provided by the sequence diagram shown in FIG. 13. Blocks 1306 and 1308 represent activities that may optionally take place after a GRC provider has been provisioned at block 1302. The activities may include updating a previously created blackout schedule (block 1306) or deleting a previously created blackout schedule (block 1308), thereby removing a blackout event. Further details on blackout event updates and deletes are provided by the sequence diagrams discussed below.

Current blackout event data may optionally be verified at block 1310. Operations personnel may use interface 1322 to query SDP 520 for the current blackout event data. In some embodiments, SDP 520 obtains the current blackout event data from OSS/BSS gateway 530 and presents the current blackout data to the user. The user may use the data to verify that a blackout event has been correctly created, updated or deleted. Further details on verifying blackout event data is provided by the sequence diagram discussed below. In some embodiments, at block 1312, information regarding blackout events that are created, updated or deleted may be sent to an EPG provider. The EPG provider may use the data to dynamically update an EPG that may be provided to IPTV customers.

At block 1314, SDP 520 provides primary and alternative (substitute) content for a blacked out event on one or more channels in accordance with the blackout event schedule and geographic boundaries established at blocks 1302-1308 above. In some embodiments, the channels may include primary content streams and substitution content streams. In some embodiments, the IPTV system ignores control channel and the embedded conditional access event information embedded within the content streams, because the blackout event data received from SDP 520 is used to determine whether content is subject to a particular blackout event. The blackout event data is used to instruct IPTV system 540 client devices to switch the appropriate content streams according to the blackout event data maintained on the SDP.

Figure 14:
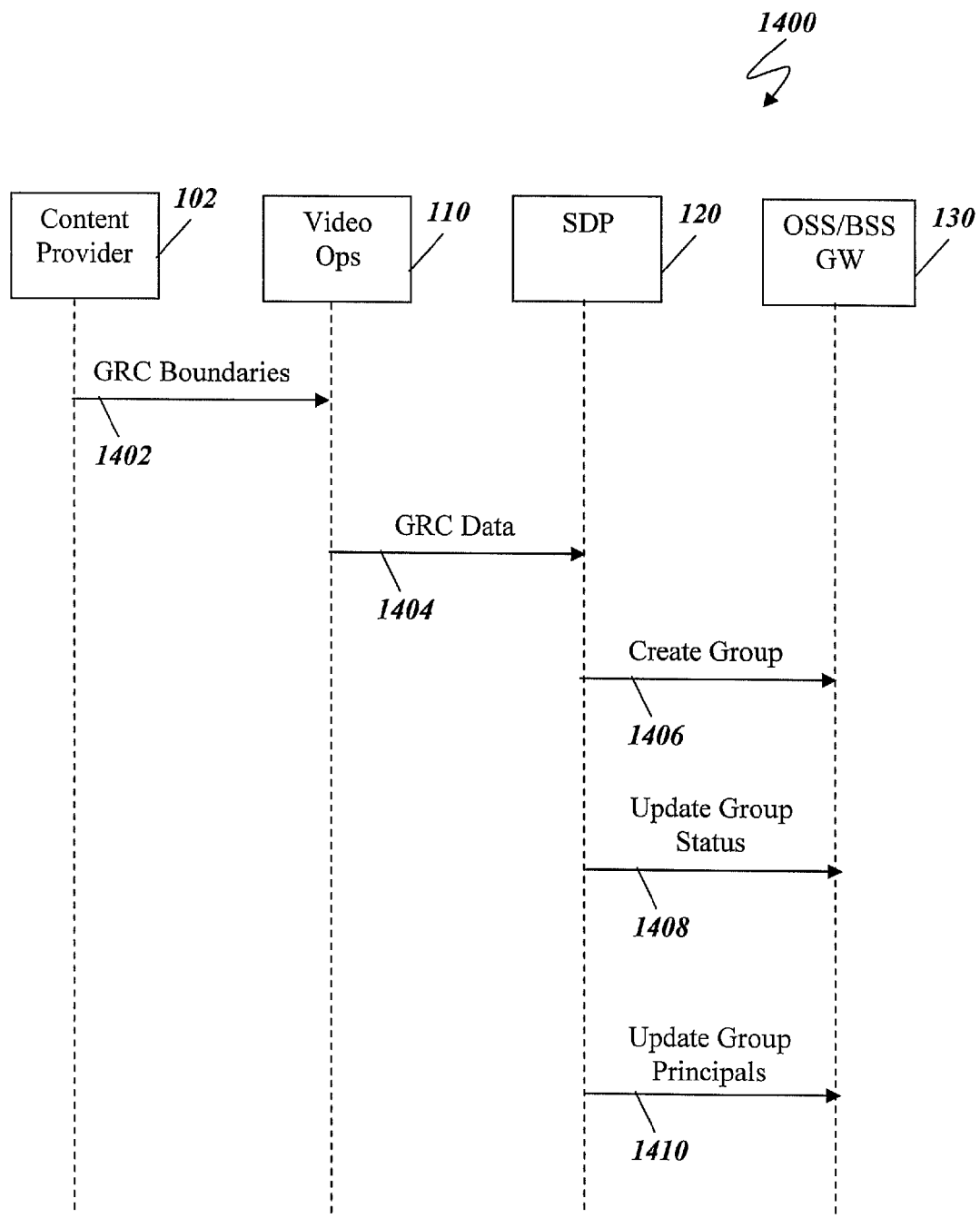
FIG. 14 is a sequence diagram for provisioning geographically restricted content for a content provider in accordance with an example embodiment.

Referring to FIG. 14, a sequence diagram for a method 1400 for provisioning geographically restricted content for a content provider in accordance with an example embodiment is shown. In some embodiments, provisioning begins at 1402 when a content provider provide list of RC boundaries. As noted above, the boundary data may be based on 3-digit/5-digit zip/zip+4 boundaries or other geographic location mechanisms. At 1404, for each content provider, video operations unit 510 enters the RC data into SDP 520 (either manually or in an automated process). In some embodiments, this data includes may include various combinations of one or more of: RC ID; RC Boundaries (3-digit zip, 5-digit zip, zip+4); Content Provider ID; Optional Team/League Effective and Expiration Date Modification Date/Modification By; Approved By.

At 1406, in some embodiments, SDP 520 additionally creates a persistent RC data structure containing normalized values for the RC boundaries. For each content provider's RC, SDP 520 may create a corresponding subscriber group in IPTV client device STBs. A subscriber group is a representation of a geographic boundary, and comprises a set of subscribers within the defined geographic area. In some embodiments, a subscriber group may include one or more of the following: Name of Subscriber Group; Status=Enabled/Disabled; and Type=Blackout. At 1408, a status attribute for the subscriber group may be updated. This may be useful for versioned RCs. At 1410, a principals list may be updated allowing for the addition and/or removal of accounts/subscribers from subscriber groups. A principal is an account holder that may be responsible for one or more subscribers.

Figure 15:
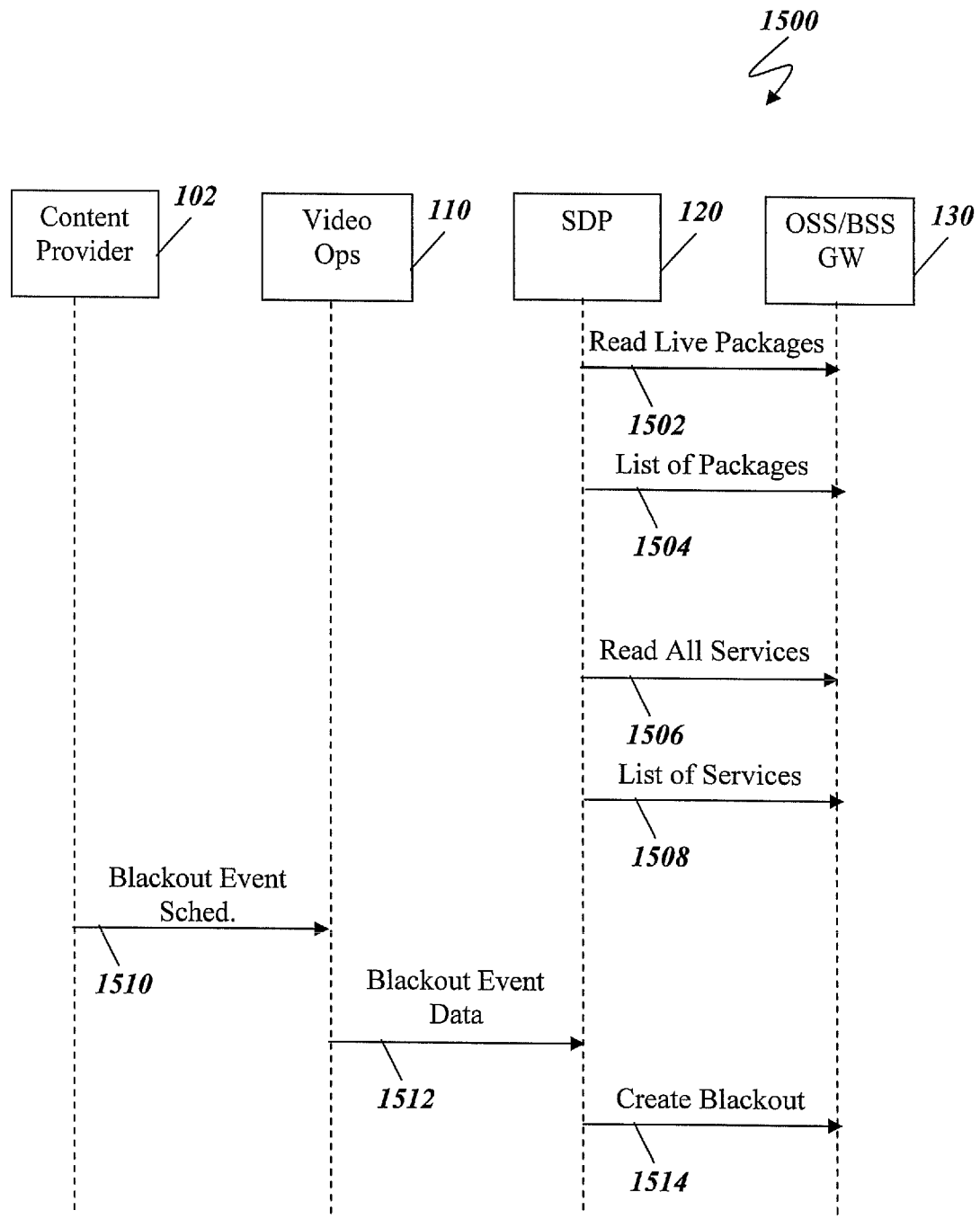
FIG. 15 is a sequence diagram for defining a blackout schedule for geographically restricted content in accordance with an example embodiment.

Referring to FIG. 15, a sequence diagram for a method 1500 for defining a blackout schedule for geographically restricted content in accordance with an example embodiment is shown. In some embodiments, SDP 520 discovers blackout service collections and the associated services contained in each service collection for each blackout channel provisioned at IPTV. For example, at 1502 SDP 520 requests a list of packages from OSS/BSS GW 530. At 1504, OSS/BSS GW 530 returns a list of packages which, for each package in the list, may contain various combinations of one or more of: Package Name; Package ID; Array of Service IDs; and Array of Package IDs for recursive package of packages. At 1506 SDP 520 requests a list of services from OSS/BSS GW 530. At 1508, OSS/BSS GW 530 returns a list of services which, for each service in the list, may contains various combinations of one or more of: Service Name; Service ID; Full Screen/PiP (defines whether service is provided as a full screen or Picture in Picture service); and Description.

At 1510, based on information received from content providers, video operations unit 510 uses interface 522 to provision a blackout event. For each content provider, video operations unit 510 will enter into the user interface 522 of SDP 520 the corresponding blackout attributes. In some embodiments, these blackout attributes may include various combinations of one or more of: Blackout ID; Affected RC(s) (one or more geographic areas to which blackout should be applied); Primary Channel; Blackout Content From list of discovered service collection and services from IPTV by SDP; Blackout Type (standard or reverse blackout); Start Date/Time (In some embodiments, on-demand blackout event execution requires a 5-minute pad time); End Date/Time; Start Mode (manual or auto); End Mode (manual or auto); Alternate Channel and Content* From list of discovered service collection and services from IPTV by SDP; Alert and Alert Mechanism (e.g. pager, phone, email, instant message etc.). At 1512, SDP 520 for each content provider, SDP 520 creates a blackout event in IPTV with the following: Subscriber Group ID; External Blackout ID (human readable text identifying blackout event) Start Date/Time; End Date/Time; Primary Main and Primary PiP ID; Secondary Main and Secondary PiP ID; and Standard or Reverse Blackout.

Figure 16:
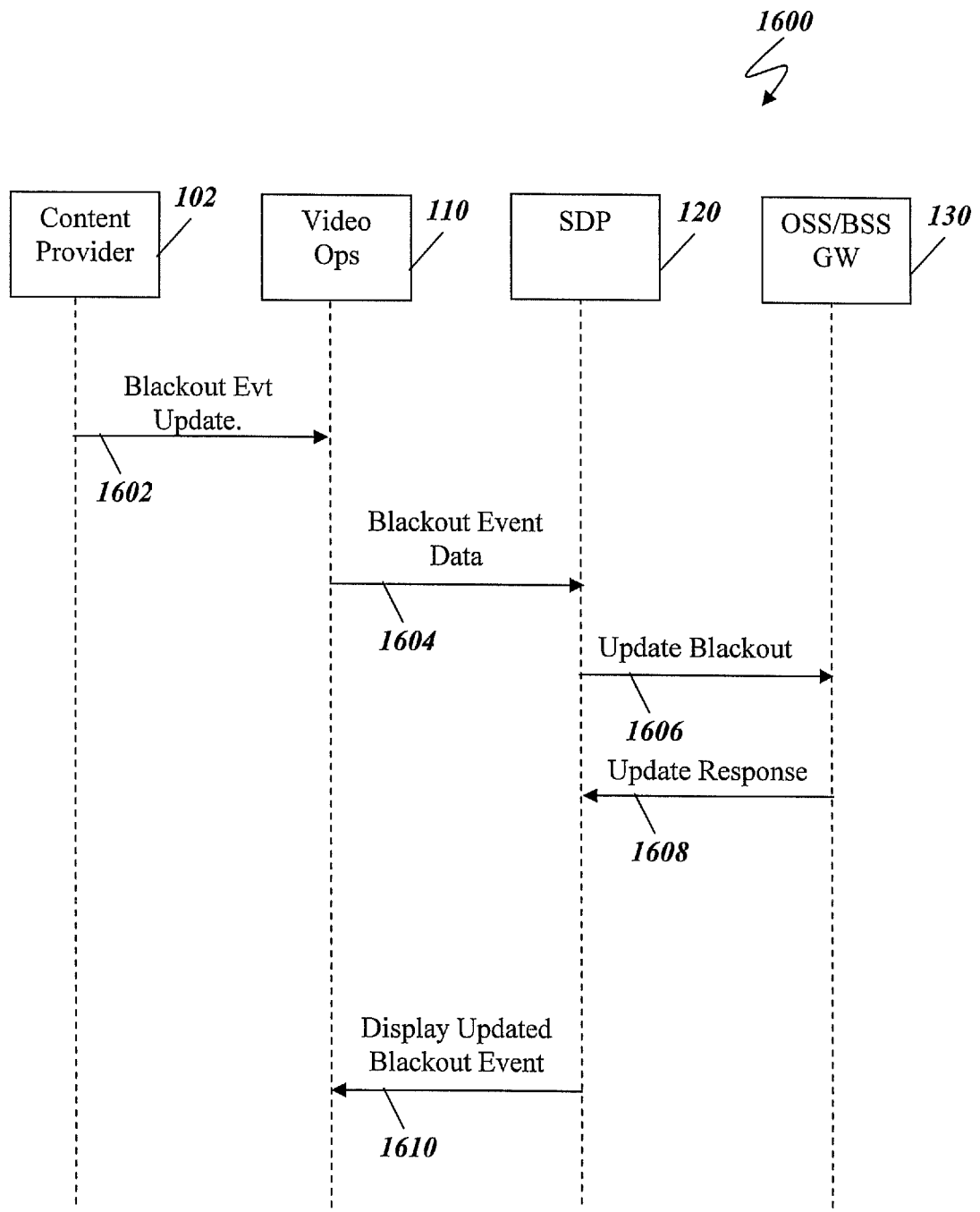
FIG. 16 is a sequence diagram for updating a blackout schedule for geographically restricted content in accordance with an example embodiment.

Referring to FIG. 16, a sequence diagram for a method 800 for updating a blackout schedule for geographically restricted content in accordance with an example embodiment is shown. The sequence begins at 1602 when video operations unit receives a request to update a blackout schedule for a content provider.

At 1604, for each content provider requesting an update, video operations unit 510 may retrieve or display previously scheduled blackout events with the following attributes to be updated: Blackout ID; Start Mode; Start Date/Time; End Mode; End Date/Time; and Alert Recipients. At 1606, SDP 520 may persist the Blackout Event updates. For each content provider, SDP may update the associated blackout event in IPTV with the following: External Blackout ID; Start Date/Time; End Date/Time; Primary Main and Primary PiP ID; and Secondary Main and Secondary Pip ID. At 1608, OSS/BSS GW 530 responds with an indication of whether or not the update was successful. At 1610, SDP 520 may display the results of the update.

Figure 17:
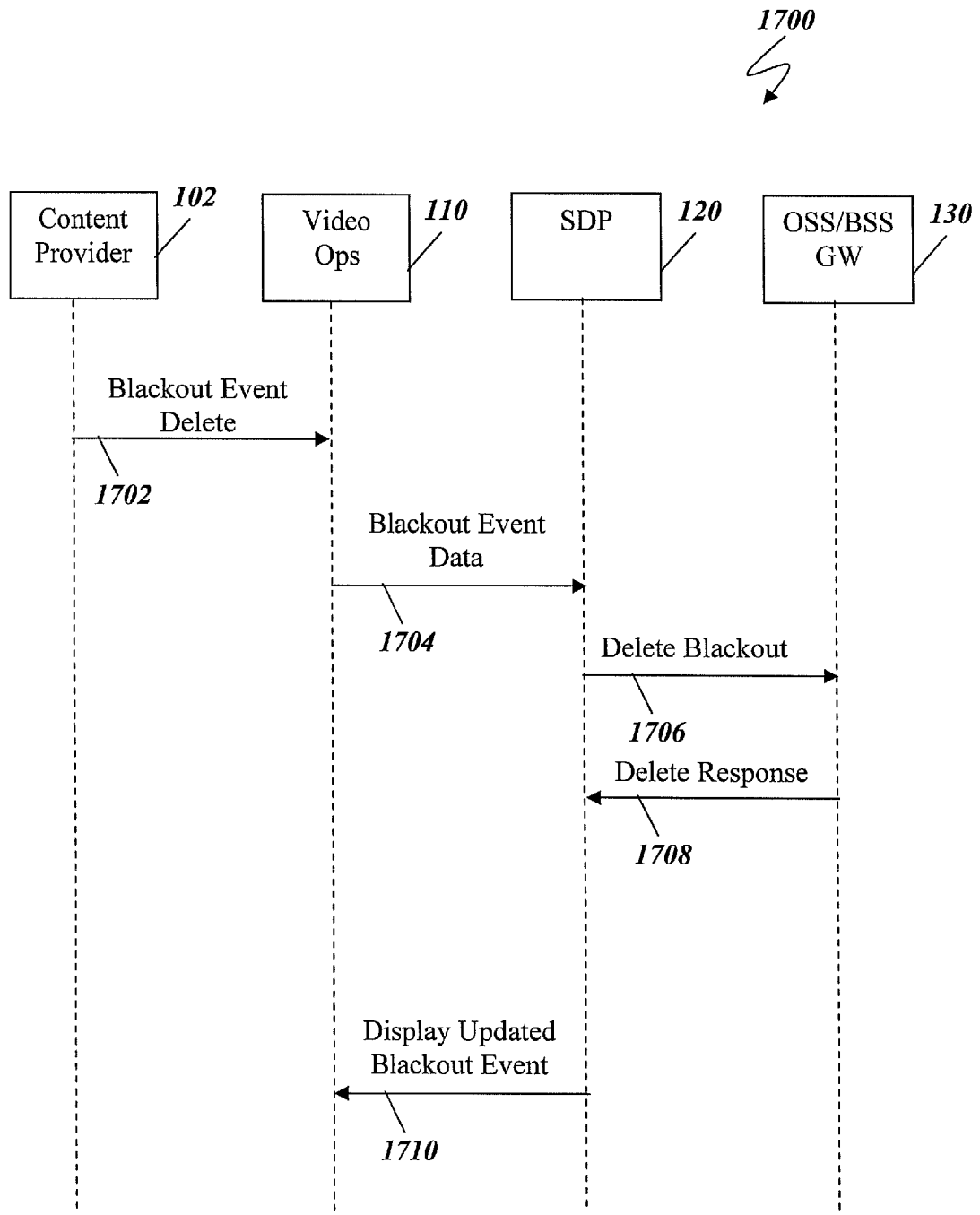
FIG. 17 is a sequence diagram for deleting a blackout schedule for geographically restricted content in accordance with an example embodiment.

Referring to FIG. 17, a sequence diagram for a method 1700 for deleting a blackout schedule for geographically restricted content in accordance with an example embodiment is shown. The sequence begins at 1702 when video operations unit 510 receives a request to delete a blackout event for a content provider 502. At 1704, for each content provider requesting blackout event deletion, video operations unit 510 may retrieve data for the currently schedule event and issues a request to SDP 520 to delete the event. At 1706, SDP 520 requests deletion of the blackout event from OSS/BSS GW 530. The blackout event may be deleted according to the blackout ID associated with the event, or according to an external ID associated with the blackout event. At 1708, OSS/BSS GW 530 responds with an indication of whether or not the deletion was successful.

Figure 18:
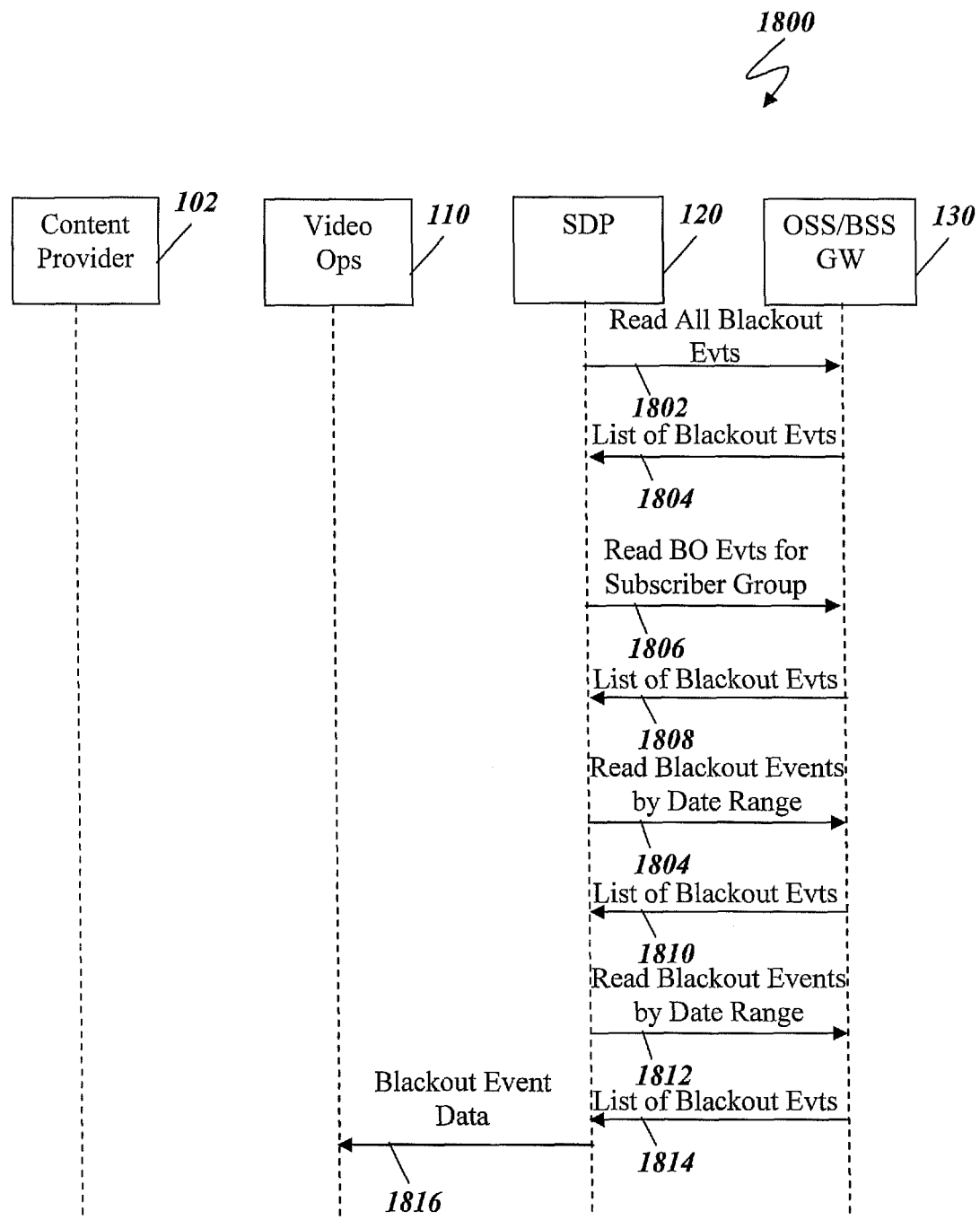
FIG. 18 is a sequence diagram for verifying a blackout schedule for geographically restricted content in accordance with an example embodiment.

Referring to FIG. 18, a sequence diagram for a method 1800 for verifying a blackout schedule for geographically restricted content in accordance with an example embodiment is shown. In some embodiments, status of executed blackout events (either the execution of the start or the end) can be verified through the retrieval of the associated blackout event, which should have an updated start status and end status if the blackout event was executed successfully. At 1802, SDP 520 requests a list of blackout events. At 1004, OSS/BSS GW 530 responds with the requested list.

At 1806, SDP 520 requests a list of blackout events for a subscriber group. At 1808, OSS/BSS GW 530 responds with the requested list. At 1810, SDP 520 requests a list of blackout events for a given date range. At 1812, OSS/BSS GW 530 responds with the requested list. At 1814, SDP 520 requests a list of blackout events by subscriber group for a given data range. At 1816 OSS/BSS GW 530 responds with the requested list. It should be noted that any one of the requests events of 1802, 1806, 1810 or 1814 may be used to request blackout event data. At 1816, SDP 520 provides the blackout statuses to video operations unit 510.

Figure 19:
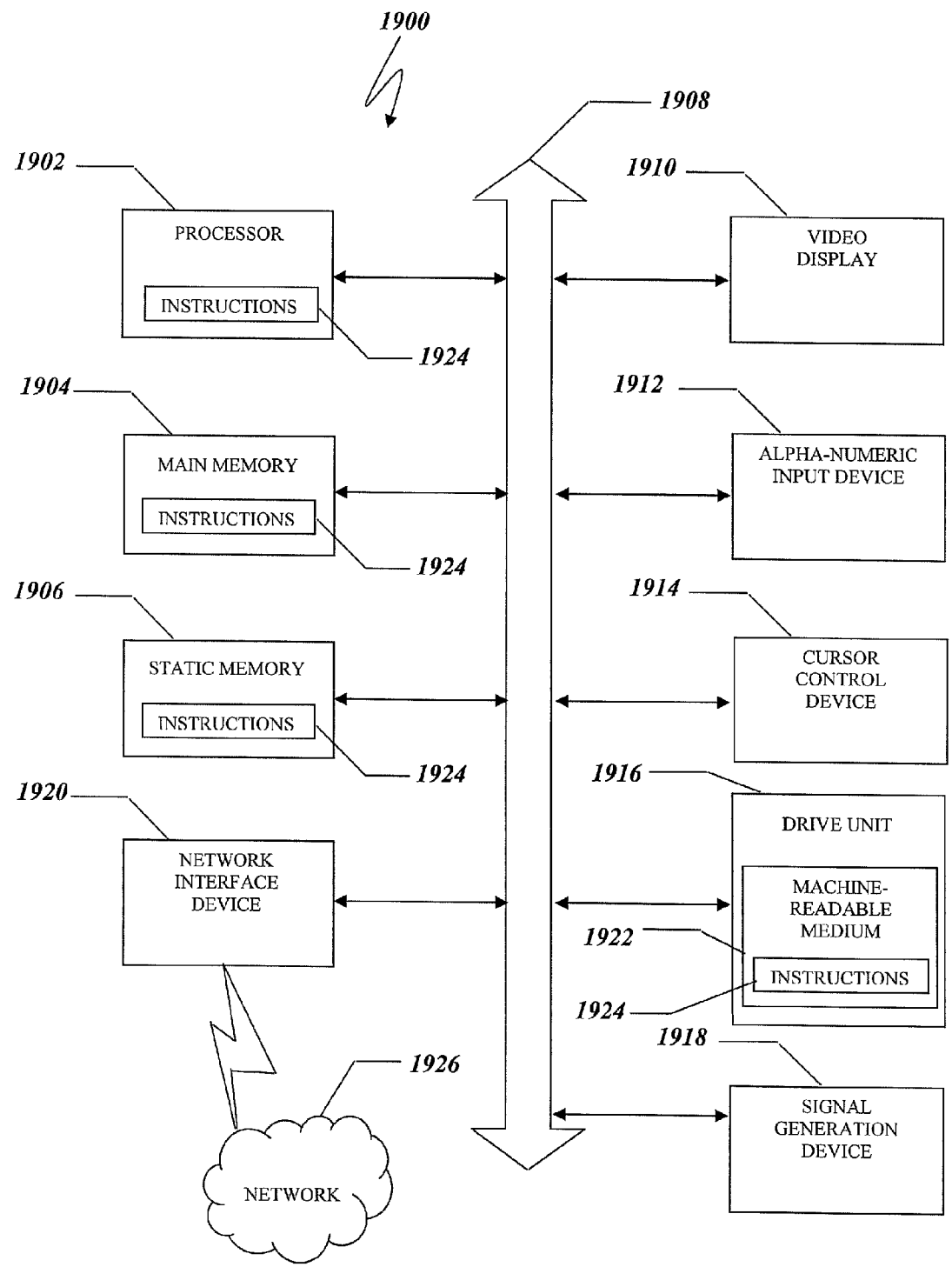
FIG. 19 is a diagrammatic representation of a machine in the form of a computer system within which a set of instructions, when executed, may cause the machine to perform any one or more of the methodologies of the illustrative embodiment.

Turning now to FIG. 19, FIG. 19 is a diagrammatic representation of a machine in the form of a computer system 1900 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the illustrative includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1900 may include a processor 1902 (e.g., a central processing unit (CPU), a graphics processing unit (GPU), or both), a main memory 1904 and a static memory 1906, which communicate with each other via a bus 1908. The computer system 1900 may further include a video display unit 1910 (e.g., liquid crystals display (LCD), a flat panel, a solid state display, or a cathode ray tube (CRT)). The computer system 1900 may include an input device 1912 (e.g., a keyboard), a cursor control device 1914 (e.g., a mouse), a disk drive unit 1916, a signal generation device 1918 (e.g., a speaker or remote control) and a network interface device 1920.

The disk drive unit 1916 may include a machine-readable medium 1922 on which is stored one or more sets of instructions (e.g., software 1924) embodying any one or more of the methodologies or functions described herein, including those methods illustrated in herein above. The instructions 1924 may also reside, completely or at least partially, within the main memory 1904, the static memory 1906, and/or within the processor 1902 during execution thereof by the computer system 1900. The main memory 1904 and the processor 1902 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the illustrative embodiment, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The illustrative embodiment contemplates a machine readable medium containing instructions 1924, or that which receives and executes instructions 1924 from a propagated signal so that a device connected to a network environment 1926 can send or receive voice, video or data, and to communicate over the network 1926 using the instructions 1924. The instructions 1924 may further be transmitted or received over a network 1926 via the network interface device 1920.

While the machine-readable medium 1922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the illustrative embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the illustrative embodiment is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the illustrative embodiment is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "illustrative embodiment" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Although the illustrative embodiment has been described with reference to several illustrative embodiments, it is understood that the words that have been used are words of description and illustration, rather than words of limitation. Changes may be made within the purview of the appended claims, as presently stated and as amended, without departing from the scope and spirit of the illustrative embodiment in its aspects. Although the illustrative embodiment has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present illustrative embodiment, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

The invention claimed is:

1. A method for managing digital video recording of alternative event data during a blackout of primary event data at a client device, the method comprising:
   receiving notification data indicating that a blackout has been cancelled for a primary event;
   proceeding with recording the scheduled digital video recording for the primary event; and
   graphically presenting the notification data of the cancelled blackout for the primary event at the client device; and
   aurally presenting the notification data of the cancelled blackout for the primary event at the client device.

2. The method of claim 1, wherein the notification data is received at the client device from a blackout management system, the computer program further comprising:
   receiving substitution event table data wherein an alternative event data is presented during a black out event, wherein the substitution event table is based on retune locations indicated in the substitution event table data; and
   receiving user input data indicating selection of an alternative program indicated by the alternative program data and recording the alternative program data indicated by the user input data during the blackout of the primary program data.

3. The method of claim 2, further comprising:
   performing default digital video recording behavior when no user input data is received, wherein the default digital video recording behavior further comprises recording the alternative program data when sufficient storage is available to store the alternative program data on a digital video recorder at the client device.

4. The method of claim 1, further comprising:
   storing client digital video recording activity data for the client device to create a user digital video recording data profile for the client device.

5. The method of claim 4, further comprising:
   recording alternative program data when an alternative program data type correlates with the user digital video recording profile.

6. A method for monitoring digital video recording at a client device for a blackout of a primary event in a data distribution system, the method comprising:
   instructions to sending notification data to client devices in a client device group indicating that a primary event is subject to a blackout;
   sending from a blackout management system in the data distribution system, restricted content data and the substitution event data table embedded in the restricted content data to each client device in the client device group;
   receiving from the client devices in the client device group, digital video recording data indicating digital video recording activity at the client devices in the client device group; and
   aurally presenting the notification data of the cancelled blackout for the primary event at the client device.

7. The method of claim 6, wherein the digital video recording activity data is selected from the group of data consisting of event start time data, event end time data, and event name data.

8. The medium of claim 7, the method further comprising:
   receiving at the blackout management system, digital video recording activity data from at least one of the client devices in the client device group; and
   instructions to correlate at the Blackout Management system, the digital video recording activity data to create a digital video recording profile for the client devices.

9. A system useful for managing digital video recording of alternative event data during a blackout of primary event data at a client device, the system comprising:
   a processor in data communication with a non-transitory computer readable medium;
   a computer program comprising instructions embedded in the computer readable medium, the computer program further comprising: instructions to present alternative event data for recording on a client device during a cancelled primary event; instructions to graphically present the notification data of the cancelled blackout for the primary event at the client device; and
   instructions to aurally present the notification data of a cancelled blackout for the primary event at the client device.

10. The system of claim 9, the computer program further comprising instructions to receive substitution event table data wherein the alternative event data is based on retune locations indicated in the substitution event table data; and instructions to receive user input data indicating selection of an alternative program indicated by the alternative program data and recording the alternative program data indicated by the user input data during the blackout of the primary program data.

11. The system of claim 10, the computer program further comprising instructions to perform default digital video recording behavior when no user input data is received, wherein the default digital video recording behavior further comprises recording the alternative program data when sufficient storage is available to store the alternative program data on a digital video recorder at the client device.

12. The system of claim 11, the computer program further comprising instructions to store client digital video recording activity data for the client device to create a user digital video recording data profile for the client device.

13. The system of claim 12, the computer program further comprising instructions to record the alternative program data when the alternative program data type correlates with the user digital video recording profile.

14. The system of claim 13, the computer program further comprising instructions to receive notification data indicating that a blackout has been cancelled for the event; and instructions to proceed with recording the scheduled digital video recording for the primary event.

* * * * *